(12) United States Patent
Lee et al.

(10) Patent No.: US 11,699,921 B2
(45) Date of Patent: Jul. 11, 2023

(54) SYSTEM AND METHOD FOR CHARGING MOBILE DEVICE IN VEHICLE

(71) Applicant: Samsung Electronics Co., Ltd., Gyeonggi-do (KR)

(72) Inventors: Dong-chang Lee, Gyeonggi-do (KR); Chong-min Lee, Seoul (KR); Bo-seok Moon, Gyeongg-do (KR)

(73) Assignee: Samsung Electronics Co., Ltd

( * ) Notice: Subject to any disclaimer, the term of this patent is extended or adjusted under 35 U.S.C. 154(b) by 129 days.

(21) Appl. No.: 16/767,333

(22) PCT Filed: Sep. 11, 2018

(86) PCT No.: PCT/KR2018/010583
§ 371 (c)(1),
(2) Date: May 27, 2020

(87) PCT Pub. No.: WO2019/132174
PCT Pub. Date: Jul. 4, 2019

(65) Prior Publication Data
US 2020/0389053 A1  Dec. 10, 2020

(30) Foreign Application Priority Data

Dec. 27, 2017 (KR) ........................ 10-2017-0181511

(51) Int. Cl.
*H02J 50/12* (2016.01)
*H04B 5/00* (2006.01)

(52) U.S. Cl.
CPC ............ *H02J 50/12* (2016.02); *H04B 5/0037* (2013.01); *H04B 5/0081* (2013.01)

(58) Field of Classification Search
CPC ..... H02J 50/12; H04B 5/0037; H04B 5/0081; B60R 16/03; B60R 16/033; B60R 16/0315; B60N 2/00; B60N 2/002
(Continued)

(56) References Cited

U.S. PATENT DOCUMENTS 7,612,528 B2  11/2009  Baarman et al.
8,421,407 B2  4/2013  Johnson
(Continued)

FOREIGN PATENT DOCUMENTS

DE  10 2016 113 284  1/2017
JP  2015-008580  1/2015
(Continued)

OTHER PUBLICATIONS

International Search Report dated Feb. 1, 2019 issued in counterpart application No. PCT/KR2018/010583, 11 pages.
(Continued)

*Primary Examiner* — Paul Dinh
(74) *Attorney, Agent, or Firm* — The Farrell Law Firm, P.C.

(57) ABSTRACT

A system and a method for charging a mobile device in a vehicle are provided. A method, performed by an electronic device, for controlling a wireless charging device in a vehicle includes: identifying at least one mobile device in the vehicle; obtaining state information of the identified mobile device; obtaining state information of the vehicle; and controlling power of a plurality of wireless charging devices in the vehicle based on a state of the mobile device and a state of the vehicle.

13 Claims, 16 Drawing Sheets

(58) Field of Classification Search
USPC .......................................................... 320/108
See application file for complete search history.

(56) References Cited

U.S. PATENT DOCUMENTS

| | | | |
|---|---|---|---|
| 8,963,504 B2 | 2/2015 | Kuroda et al. | |
| 9,455,595 B2 | 9/2016 | Jeon et al. | |
| 9,577,466 B2 | 2/2017 | Ku et al. | |
| 10,486,538 B2 | 11/2019 | Lewis | |
| 2014/0203770 A1* | 7/2014 | Salter ................... | H02J 7/0047 320/108 |
| 2016/0144726 A1 | 5/2016 | Yoshida et al. | |
| 2017/0047786 A1 | 2/2017 | Park et al. | |
| 2017/0104865 A1* | 4/2017 | Skelton ............... | H04L 63/0876 |
| 2017/0282744 A1 | 10/2017 | Koo et al. | |
| 2018/0198313 A1* | 7/2018 | Lee ........................ | H02J 50/12 |

FOREIGN PATENT DOCUMENTS

| | | |
|---|---|---|
| KR | 1020110091616 | 8/2011 |
| KR | 10-1145682 | 5/2012 |
| KR | 10-1158145 | 6/2012 |
| KR | 1020130047722 | 5/2013 |
| KR | 1020140029895 | 3/2014 |
| KR | 10-1535018 | 7/2015 |
| KR | 10-1561471 | 10/2015 |
| KR | 1020160025200 | 3/2016 |
| KR | 1020160034578 | 3/2016 |
| KR | 10-1619594 | 5/2016 |
| KR | 1020160077830 | 7/2016 |
| KR | 1020170025015 | 3/2017 |
| KR | 1020170051100 | 5/2017 |
| KR | 1020170107199 | 9/2017 |
| KR | 1020170114148 | 10/2017 |
| KR | 10-1792140 | 11/2017 |
| WO | WO 2011/018959 | 2/2011 |

OTHER PUBLICATIONS

European Search Report dated Sep. 16, 2021 issued in counterpart application No. 18894429.2-1132, 5 pages.
European Search Report dated Dec. 1, 2020 issued in counterpart application No. 18894429.2-1132, 7 pages.
Korean Office Action dated Jun. 27, 2022 issued in counterpart application No. 10-2017-0181511, 11 pages.
Korean Office Action dated Dec. 29, 2022 issued in counterpart application No. 10-2017-0181511, 9 pages.
European Search Report dated Mar. 16, 2023 issued in counterpart application No. 18894429.2-1009, 57 pages.

* cited by examiner

SYSTEM AND METHOD FOR CHARGING MOBILE DEVICE IN VEHICLE

PRIORITY

This application is a National Phase Entry of PCT International Application No. PCT/KR2018/010583 which was filed on Sep. 11, 2018, and claims priority to Korean Patent Application No. 10-2017-0181511, which was filed on Dec. 27, 2017, the content of each of which is incorporated herein by reference.

TECHNICAL FIELD

The present disclosure relates to a system and a method for charging a mobile device in a vehicle, and more particularly, to a system and a method for controlling, by an electronic device in a vehicle, an operation of a wireless charging device in the vehicle.

BACKGROUND ART

Along with the development of network and multimedia technologies, an electronic device for controlling a vehicle may operate in conjunction with a mobile device, and a wireless charging device capable of charging the mobile device may be provided in the vehicle. However, an amount of electricity needed to operate a vehicle has gradually increased, and an amount of electricity consumed by a wireless charging device in the vehicle may not be ignored for a perfect operation of the vehicle. Accordingly, there is demand for a technique of identifying a mobile device in a vehicle and efficiently charging the mobile device.

DESCRIPTION OF EMBODIMENTS

Technical Problem

Some embodiments provide a system and a method for charging a mobile device in a vehicle, capable of efficiently controlling power of a wireless charging device in the vehicle based on a state of the mobile device in the vehicle and a state of the vehicle.

In addition, some embodiments provide a system and a method for charging a mobile device in a vehicle, capable of selectively controlling power of a plurality of wireless charging devices in the vehicle based on a state of the mobile device in the vehicle and a state of the vehicle.

In addition, some embodiments provide a system and a method for charging a mobile device in a vehicle, capable of adjusting a charging strength of a wireless charging device in the vehicle based on a state of the mobile device in the vehicle and a state of the vehicle.

BEST MODE

Figure 1:
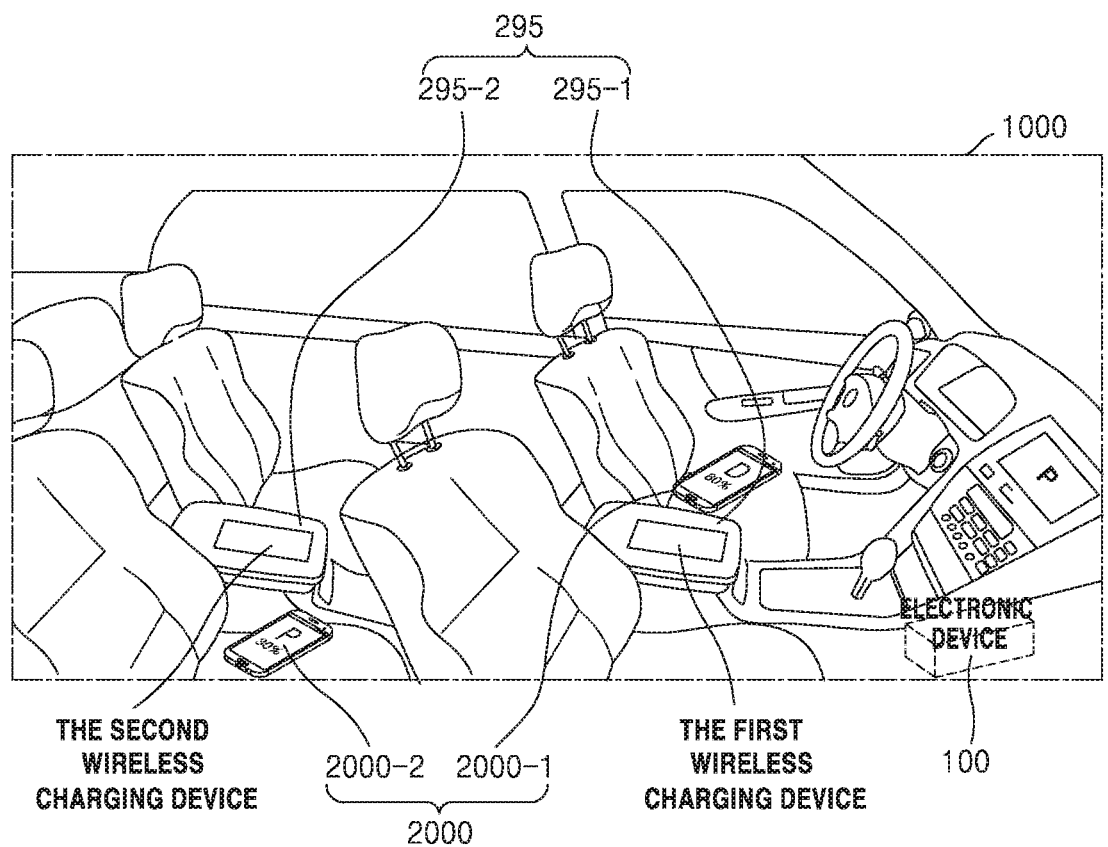
FIG. 1 illustrates a system for charging a mobile device in a vehicle, according to some embodiments.

According to a first aspect of the present disclosure, there is provided a method, performed by an electronic device, of controlling a wireless charging device in a vehicle, the method including: identifying at least one mobile device in the vehicle; obtaining state information of the identified mobile device; obtaining state information of the vehicle; and controlling power of a plurality of wireless charging devices in the vehicle based on a state of the mobile device and a state of the vehicle.

According to a second aspect of the present disclosure, there is provided an electronic device for controlling a wireless charging device in a vehicle, the electronic device including: a communication unit configured to communicate with at least one mobile device in the vehicle; a storage unit storing at least one instructions for controlling the wireless charging device in the vehicle; and a processor configured, by executing the stored at least one instructions, to identify at least one mobile device in the vehicle, obtain state information of the identified mobile device, obtain state information of the vehicle, and control power of a plurality of wireless charging devices in the vehicle based on a state of the mobile device and a state of the vehicle.

According to a third aspect of the present disclosure, there is provided a computer-readable recording medium having recorded thereon a program for executing, in a computer, the method according to the first aspect.

Mode of Disclosure

Hereinafter, embodiments of the present disclosure will be described in detail with reference to the accompanying drawings such that those of ordinary skill in the art to which the present disclosure belongs could easily carry out the embodiments. However, the present disclosure could be implemented in various different forms and is not limited to the embodiments described herein. In addition, in the drawings, parts irrelevant to the description are omitted to clearly describe the present disclosure, and like reference numerals denote like elements throughout the specification.

Throughout the specification, when it is described that a certain part is "connected" to another part, it should be understood that the certain part may be "directly connected" or "electrically connected" to another part via another element in the middle. In addition, when a certain part "includes" a certain component, this indicates that the part may further include another component instead of excluding another component unless there is different disclosure.

Hereinafter, the present disclosure will be described in detail with reference to the accompanying drawings.

FIG. 1 illustrates a system for charging a mobile device in a vehicle, according to some embodiments.

Referring to FIG. 1, the system for charging a mobile device in a vehicle 1000, according to some embodiments, may include the vehicle 1000, an electronic device 100 in the vehicle 1000, and at least one wireless charging device 295 and at least one mobile device 2000 in the vehicle 1000.

When a user rides on the vehicle 1000, the electronic device 100 may identify the at least one mobile device 2000 in the vehicle 1000 and control an operation of the wireless charging device 295 in the vehicle 1000 based on a state of the identified mobile device 2000 In this case, the electronic device 100 may communicate with the mobile device 2000 by using a preset communication scheme. The electronic device 100 may check the number of identified mobile devices 2000, remaining battery capacities of the identified mobile devices 2000, and the like from the mobile devices 2000 and charge the mobile devices 2000 while efficiently using power for controlling an operation of the vehicle 1000.

In addition, the electronic device 100 may obtain information about a state of the vehicle 1000 and control an operation of the wireless charging device 295 by considering the state of the vehicle 1000. When a plurality of wireless charging devices 295 are in the vehicle 1000, the electronic device 100 may selectively turn on/off power of the wireless charging devices 295 and selectively adjust charging strengths of the wireless charging devices 295.

The electronic device 100 may be a device for controlling an operation of the vehicle 1000, e.g., a head unit of the vehicle 1000. Alternatively, the electronic device 100 may be connected to the head unit of the vehicle 1000, e.g., a smartphone, a tablet personal computer (PC), a PC, a smart TV, a cellular phone, a personal digital assistant (PDA), a laptop computer, a black box device, a media player, a micro-server, a navigation device, or another mobile or non-mobile computing device but is not limited thereto. Alternatively, the electronic device 100 may be a wearable device, such as a watch, glasses, a hairband, or a ring, having a communication function and a data processing function.

However, the electronic device 100 is not limited thereto and may include all types of devices capable of controlling the wireless charging device 295 to charge the mobile device 2000 in the vehicle 1000 while controlling an operation of the vehicle 1000. In this case, the electronic device 100 may be connected to the head unit of the vehicle 1000 through wired/wireless communication. For example, the electronic device 100 may be connected to the head unit of the vehicle 1000 through a wireless local area network (Wi-Fi), Bluetooth, Bluetooth low energy (BLE), ZigBee, Wi-Fi Direct (WFD), ultra wideband (UWB), infrared data association (IrDA), near field communication (NFC), and the like but is not limited thereto.

The components shown in the system of FIG. 1 may communicate with each other through a network. The network includes a local area network (LAN), a wide area network (WAN), a value added network (VAN), a mobile radio communication network, a satellite communication network, and a combination thereof, is a data communication network of an inclusive meaning, which enables each configuration entity needed for implementation of the present disclosure to smoothly communicate with each other, and may include wired Internet, wireless Internet, and a mobile wireless communication network.

Figure 2:
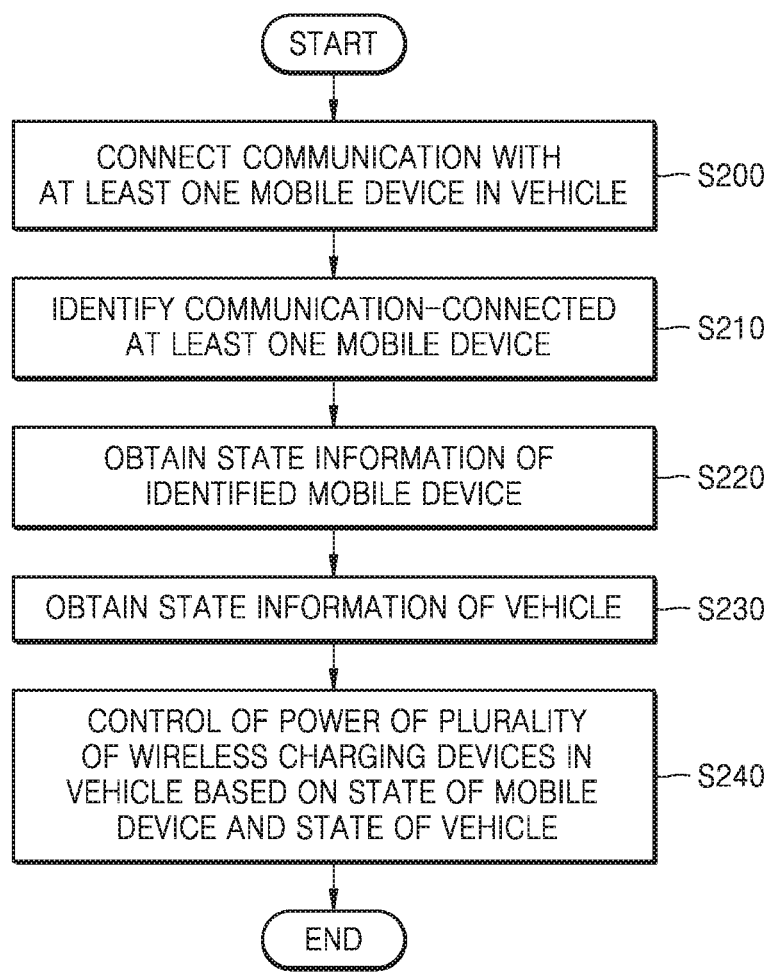
FIG. 2 is a flowchart of a method, performed by an electronic device, of controlling a wireless charging device in a vehicle, according to some embodiments.

FIG. 2 is a flowchart of a method, performed by an electronic device, of controlling a wireless charging device in a vehicle, according to some embodiments.

In operation S200, the electronic device 100 may be connected through communication to at least one mobile device 2000 in the vehicle 1000. The electronic device 100 may be connected through communication to the at least one mobile device 2000 in the vehicle 1000 by using a preset short-range communication scheme. When a short-range communication function of the mobile device 2000 is activated, the electronic device 100 may automatically identify the mobile device 2000 as soon as a user rides on the vehicle 1000.

When the short-range communication function of the mobile device 2000 is not activated, a wireless communication function of the mobile device 2000 may be set such that the wireless communication function of the mobile device 2000 is activated as soon as the mobile device 2000 is on the wireless charging device 295. In this case, when the mobile device 2000 is on the wireless charging device 295, the wireless communication function of the mobile device 2000 is activated, and then the electronic device 100 may communicate with the mobile device 2000. The electronic device 100 may be connected through communication to the mobile device 2000 directly or via the wireless charging device 295.

When the short-range communication function of the mobile device 2000 is not activated, the electronic device 100 may request communication connection with the mobile device 2000 via the wireless charging device 295 as soon as the mobile device 2000 is on the wireless charging device 295.

In operation S210, the electronic device 100 may identify the at least one mobile device 2000 connected thereto through communication. The electronic device 100 may identify the mobile device 2000 in the vehicle 1000 by receiving identification information from the at least one mobile device 2000 connected thereto through communication. In addition, when the mobile device 2000 is identified, the electronic device 100 may display, on a display unit 281, a message for informing that the mobile device 2000 has been identified. The message for informing that the mobile device 2000 has been identified may include an identifier (ID) of the identified mobile device 2000, a text indicating that the mobile device 2000 is connected through communication, and a text indicating that the mobile device 2000 has been identified, but is not limited thereto. Alternatively, when the electronic device 100 is connected through communication to the mobile device 2000 in operation S200, the electronic device 100 may display, on the display unit 281, a message for informing that the mobile device 2000 has been identified.

In addition, when the mobile device 2000 is identified, the electronic device 100 may output, through an acoustic output unit 282, sound for informing that the mobile device 2000 has been identified. Alternatively, when the electronic device 100 is connected through communication to the mobile device 2000 in operation S200, the electronic device 100 may output, through the acoustic output unit 282, sound for informing that the mobile device 2000 has been identified.

In operation S220, the electronic device 100 may obtain state information of the identified mobile device 2000. The electronic device 100 may receive the state information of the mobile device 2000 from the mobile device 2000. The state information of the mobile device 2000 may include state information related to a remaining battery capacity of the mobile device 2000. The state information of the mobile device 2000 may include, for example, information about a remaining battery capacity, a current power consumption amount, the number of applications being executed, and the like but is not limited thereto.

In operation S230, the electronic device 100 may obtain state information of the vehicle 1000. The state information of the vehicle 1000 may include, for example, information about a voltage of a battery in the vehicle 1000, a current power consumption amount of the vehicle 1000, and a traveling speed of the vehicle 1000.

In addition, the state information of the vehicle 1000 may include information about whether a user has sat on a seat of the vehicle 1000. In this case, a predetermined sensor may be at a seat part of the vehicle 1000, and the electronic device 100 may detect whether the user has sat on a seat, based on sensing information generated by the sensor.

In operation S240, the electronic device 100 may control power of a plurality of wireless charging devices 295 in the vehicle 1000 based on a state of the mobile device 2000 and a state of the vehicle 1000. The electronic device 100 may select a wireless charging device 295 to be turned on among the plurality of wireless charging devices 295, based on the state of the mobile device 2000 and the state of the vehicle 1000. In addition, the electronic device 100 may transmit, to the selected wireless charging device 295, a control signal for turning on power of the selected wireless charging device 295.

Figure 3:
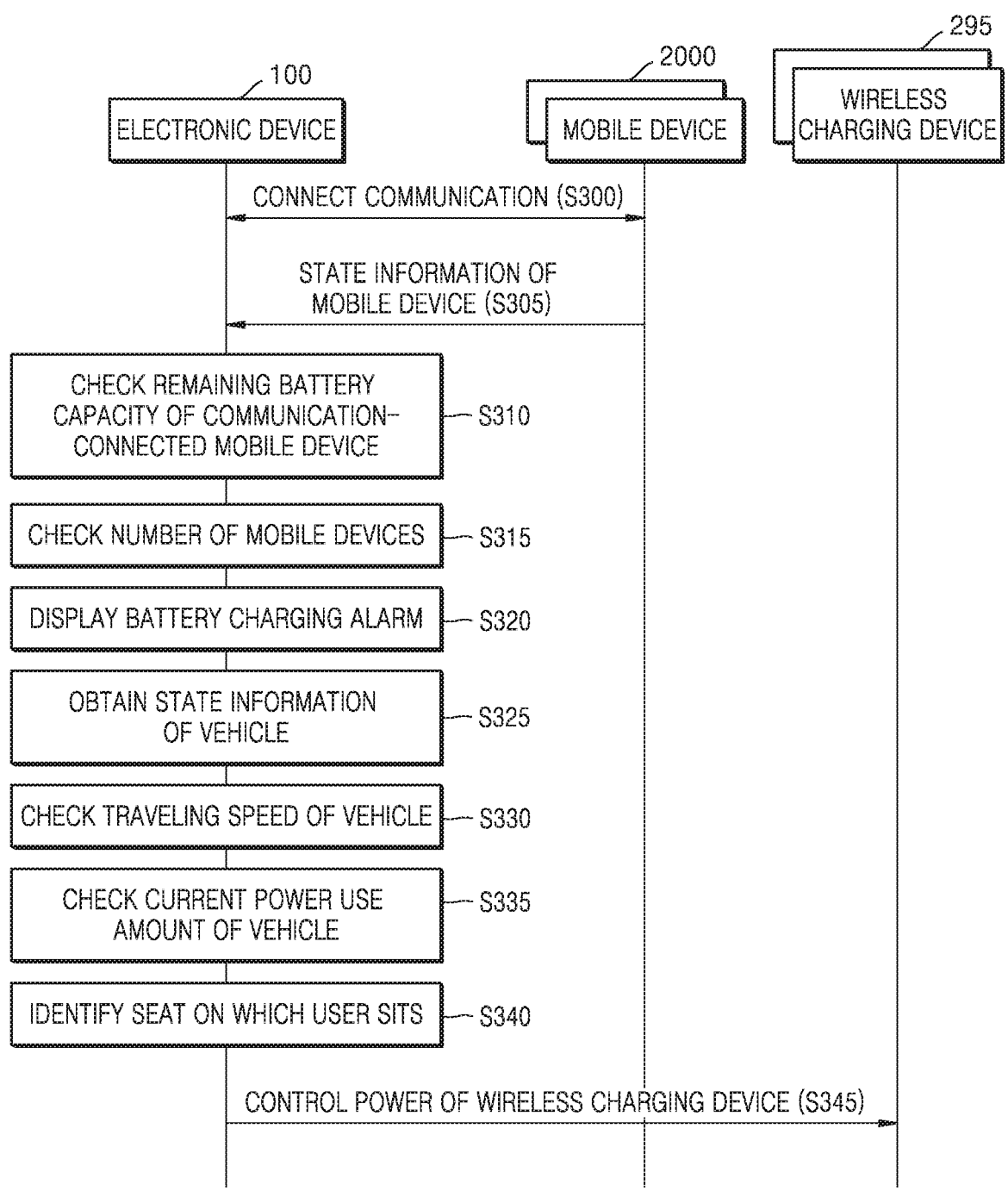
FIG. 3 is a signaling diagram of a method, performed by an electronic device, of controlling a wireless charging device based on a state of a mobile device and a state of a vehicle, according to some embodiments.

FIG. 3 is a signaling diagram of a method, performed by an electronic device, of controlling a wireless charging device based on a state of a mobile device and a state of a vehicle, according to some embodiments.

In operation S300, the electronic device 100 may be connected through communication to a mobile device 2000, and in operation S305, the electronic device 100 may receive state information of the mobile device 2000 from the mobile device 2000.

In operation S310, the electronic device 100 may check a remaining battery capacity of the mobile device 2000 connected thereto through communication. The electronic device 100 may check the remaining battery capacity of the mobile device 2000 from the state information of the mobile device 2000. The state information of the mobile device 2000 may include, for example, information about a remaining battery capacity, a current power consumption amount, the number of applications being executed, and the like. The electronic device 100 may also check a predicted battery consumption amount, a battery consumption speed, and the like of the mobile device 2000 from the state information of the mobile device 2000.

In operation S315, the electronic device 100 may check the number of mobile devices 2000. The electronic device 100 may estimate the number of mobile devices 2000 based on a communication connection result with mobile devices 2000 in the vehicle 1000. Alternatively, the electronic device 100 may estimate the number of mobile devices 2000 in the vehicle 1000 based on the number of seats on which it is determined that a user has sat among the seats in the vehicle 1000. The electronic device 100 may determine whether a user has sat on a seat, by using a sensor provided to the seat.

Alternatively, the electronic device 100 may estimate the number of mobile devices 2000 in the vehicle 1000 based on the number of doors opened and closed among the doors of the vehicle 1000 and an opened time of each door within a preset time before/after the vehicle 1000 is started.

In operation S320, the electronic device 100 may display a battery charging alarm. The electronic device 100 may check a remaining battery capacity of a mobile device 2000 and display, on a display device in the vehicle 1000, an alarm message indicating that charging of a battery of the mobile device 2000 is necessary. The alarm message may include, for example, information about an identification value of the mobile device 2000, a remaining battery capacity of the mobile device 2000, a battery consumption speed of the mobile device 2000, and the like but is not limited thereto.

The message for informing that the mobile device 2000 has been identified may be displayed on the display unit 281 together with the alarm message, in operation S320, indicating that charging of a battery is necessary, but the present embodiment is not limited thereto.

In operation S325, the electronic device 100 may obtain state information of the vehicle 1000. The electronic device 100 may receive state information of the vehicle 1000 in a preset period from a device (not shown) for managing state information of the vehicle 1000. The device (not shown) for managing state information of the vehicle 1000 may be included in the electronic device 100. The state information of the vehicle 1000 may include, for example, information about a voltage of a battery in the vehicle 1000, a current power consumption amount of the vehicle 1000, and a traveling speed of the vehicle 1000. In addition, the state information of the vehicle 1000 may include information about whether a user has sat on a seat of the vehicle 1000.

In operation S330, the electronic device 100 may check a traveling speed of the vehicle 1000. The electronic device 100 may extract information indicating a traveling speed of the vehicle 1000 from the state information obtained in operation S325.

In operation S335, the electronic device 100 may check a current power use amount of the vehicle 1000. A current power use amount of the vehicle 1000 may increase by an operation of a device included in the vehicle 1000 and an operation of an external device separately connected to the vehicle 1000. The device included in the vehicle 1000 may include, for example, an air conditioner, a heater, a black box, headlights, taillights, signal lights, heated seats, ventilation seats, and a multimedia device but is not limited thereto. In addition, the external device separately connected to the vehicle 1000 may include, for example, a black box, an external device connected through a cigar jack, and an external device connected through a universal serial bus (USB) terminal but is not limited thereto.

In addition, a current power use amount of the vehicle 1000 may be information calculated or predicted by a vehicle information collection device in the vehicle 1000. The vehicle information collection device may include, for example, an on-board diagnostics (OBD) device but is not limited thereto. A current power use amount of the vehicle 1000 may be estimated by considering power consumption of devices in the vehicle 1000, operations being executed by the devices in the vehicle 1000, and the like. Alternatively, for example, a current power use amount of the vehicle 1000 may be measured by hardware through a power consumption measurement device in the vehicle 1000.

The electronic device 100 may extract a traveling speed of the vehicle 1000 and a current power use amount of the vehicle 1000 from the state information obtained in operation S325.

In operation S340, the electronic device 100 may identify a seat on which a user has sat. The electronic device 100 may extract information about whether a user has sat on a seat of the vehicle 1000, from the state information of the vehicle 1000. Alternatively, the electronic device 100 may determine whether a user has sat on a seat, based on sensing information generated by a sensor provided to the seat. In this case, for example, a plurality of pressure sensors may be at the seat. In addition, the electronic device 100 may determine whether a user has sat on a seat, according to a preset criterion based on a strength of a force applied to the plurality of pressure sensors and a change in the strength of the force.

In operation S345, the electronic device 100 may control power of a wireless charging device 295. The electronic device 100 may control power of the wireless charging device 295 based on a state of the mobile device 2000 and a state of the vehicle 1000. The electronic device 100 may select at least one of a plurality of wireless charging devices 295 based on at least one of, for example, a remaining battery capacity of the mobile device 2000, the number of mobile devices 2000, a traveling speed of the vehicle 1000, a current power use amount of the vehicle 1000, and a location of a seat on which it is determined that a user has sat, and control power of the selected wireless charging device 295.

The electronic device 100 may select at least one of the plurality of wireless charging devices 295 based on a remaining battery capacity of the mobile device 2000 and turn on or off power of the selected wireless charging device 295. The electronic device 100 may identify a mobile device 2000 of which a remaining battery capacity is a predetermined value or lower, and turn on power of a wireless charging device 295 located in the vicinity of the identified mobile device 2000. In this case, the electronic device 100 may control power of the wireless charging device 295 based on not only a remaining battery capacity but also a battery consumption speed and the number of applications being executed in the mobile device 2000.

Alternatively, the electronic device 100 may select at least one of the plurality of wireless charging devices 295 based on the number of mobile devices 2000 in the vehicle 1000 and turn on or off power of the selected wireless charging device 295. The electronic device 100 may estimate the number of mobile devices 2000 in the vehicle 1000, and when the estimated number is a preset number or greater, the electronic device 100 may select a wireless charging device 295 of which power is to be turned on among the plurality of wireless charging devices 295. For example, when the number of mobile devices 2000 in the vehicle 1000 is estimated to be two or less, the electronic device 100 may turn on power of a first wireless charging device 295-1 beside a driver's seat. Alternatively, for example, when the number of mobile devices 2000 in the vehicle 1000 is estimated to be three or greater, the electronic device 100 may turn on power of a second wireless charging device 295-2 at back seats together with the power of the first wireless charging device 295-1 beside the driver's seat.

Alternatively, the electronic device 100 may select at least one of the plurality of wireless charging devices 295 based on a traveling speed of the vehicle 1000 and a current power use amount of the vehicle 1000 and turn on or off power of the selected wireless charging device 295. For example, it is determined whether a traveling speed of the vehicle 1000 is a predetermined value or greater and whether a current power use amount of the vehicle 1000 is a predetermined value or greater, and power of at least one of the plurality of wireless charging devices 295 may be turned on based on the determination result.

Alternatively, the electronic device 100 may estimate a location of a mobile device 2000 and select a wireless charging device 295 of which power is to be turned on among the plurality of wireless charging devices 295 based on the estimated location of the mobile device 2000. For example, the electronic device 100 may identify whether a mobile device 2000 connected thereto through communication is registered in the electronic device 100, and when the mobile device 2000 connected through communication to the electronic device 100 is registered in the electronic device 100, the electronic device 100 may turn on power of the first wireless charging device 295-1 beside the driver's seat. In addition, when a mobile device 2000, which is not registered in the electronic device 100, is identified, and it is recognized that a back door of the vehicle 1000 has been opened and closed, the electronic device 100 may turn on power of the second wireless charging device 295-2 at the back seats of the vehicle 1000.

Alternatively, the electronic device 100 may select at least one of the plurality of wireless charging devices 295 based on a seat on which it is determined that a user has sat, and turn on or off power of the selected wireless charging device 295. For example, when it is determined that a user has sat on only a front seat of the vehicle 1000, the electronic device 100 may turn on only power of the first wireless charging device 295-1 at the front seats of the vehicle 1000. For example, when it is determined that users have sat on a front seat and a back seat of the vehicle 1000, respectively, the electronic device 100 may turn on both power of the first wireless charging device 295-1 at the front seats of the vehicle 1000 and power of the second wireless charging device 295-2 at the back seats of the vehicle 1000.

A method, performed by the electronic device 100, of estimating a location of the mobile device 2000 is not limited to the above description, and the electronic device 100 may estimate a location of the mobile device 2000 in various methods based on, for example, a strength of a communication signal, an image captured by a camera in the vehicle 1000, a signal sensed by a sensor in the vehicle 1000, and the like.

Figure 4:
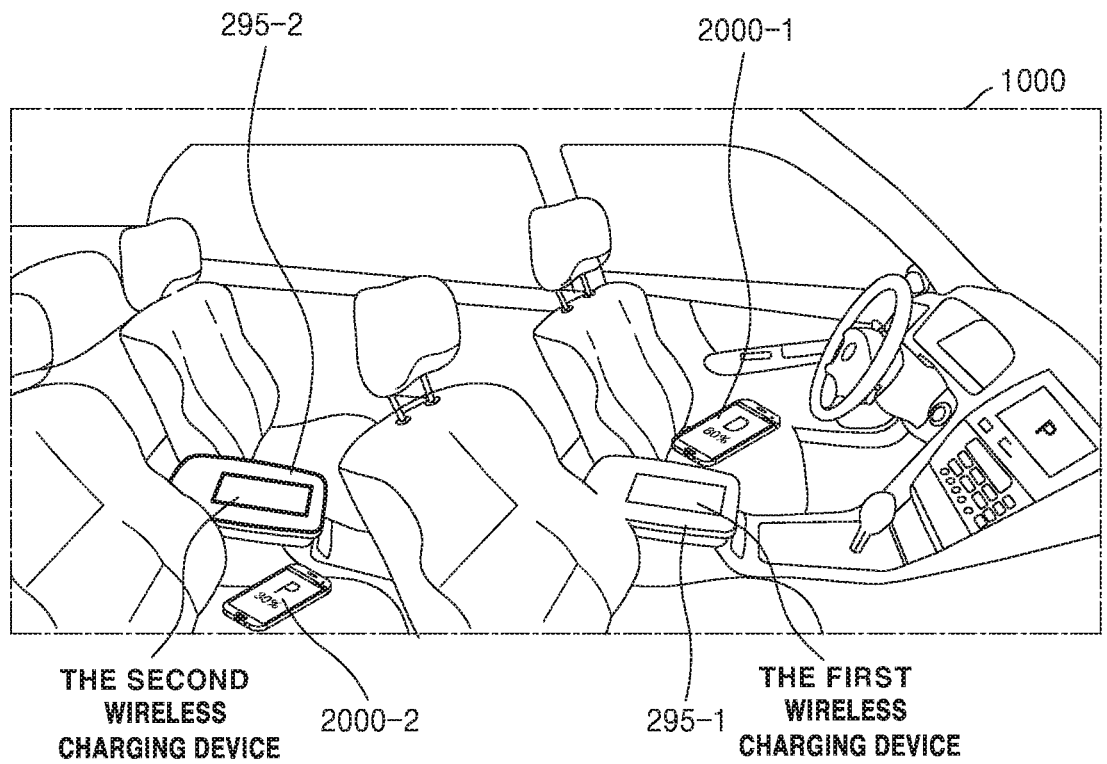
FIG. 4 illustrates an example in which an electronic device selectively controls power of wireless charging devices, according to some embodiments.

FIG. 4 illustrates an example in which an electronic device selectively controls power of wireless charging devices, according to some embodiments.

Referring to FIG. 4, a first mobile device 2000-1 may be at the front seats of the vehicle 1000, and a second mobile device 2000-2 may be at the back seats of the vehicle 1000. In addition, a remaining battery capacity of the first mobile device 2000-1 may be 80%, and a remaining battery capacity of the second mobile device 2000-2 may be 30%. In this case, the electronic device 100 may determine that the remaining battery capacity of the first mobile device 2000-1 at the front seats of the vehicle 1000 is a predetermined value or greater, and the remaining battery capacity of the second mobile device 2000-2 is the predetermined value or less. In addition, the electronic device 100 may turn off power of the first wireless charging device 295-1 at the front seats of the vehicle 1000 and turn on power of the second wireless charging device 295-2 at the back seats of the vehicle 1000, based on the determination result.

Figure 5:
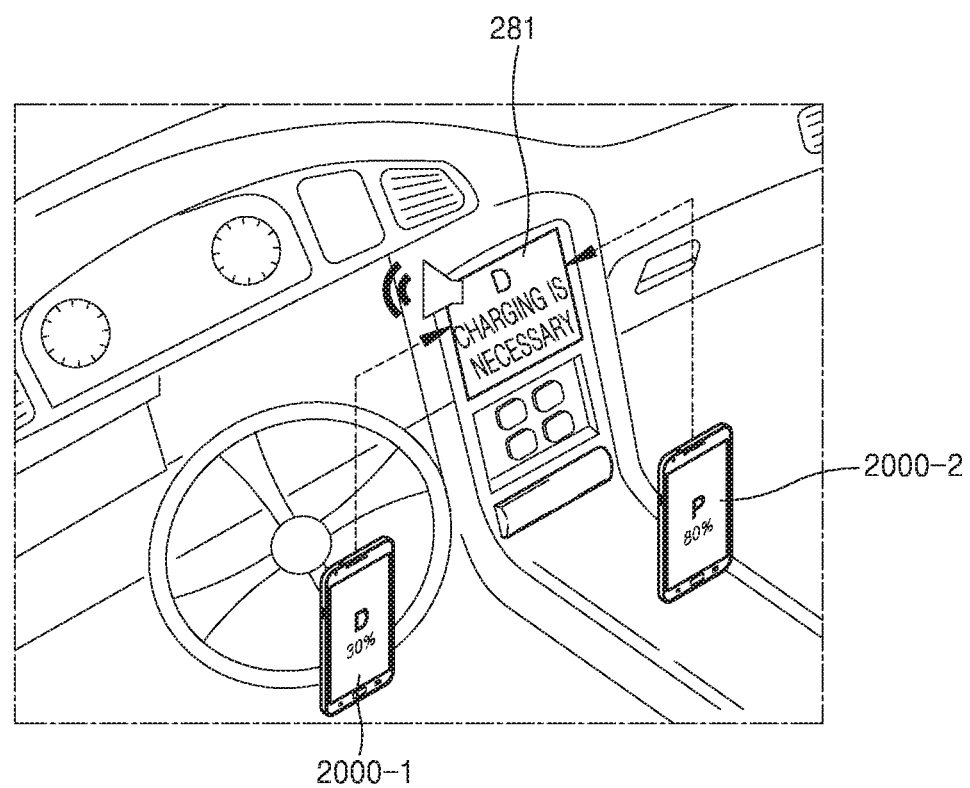
FIG. 5 illustrates an example in which an electronic device displays a battery charging alarm, according to some embodiments.

FIG. 5 illustrates an example in which an electronic device displays a battery charging alarm, according to some embodiments.

Referring to FIG. 5, the electronic device 100 may identify that a remaining battery capacity of the first mobile device 2000-1 in the vehicle 1000 is 30%, and a remaining battery capacity of the second mobile device 2000-2 in the vehicle 1000 is 80%. In addition, the electronic device 100 may determine that the remaining battery capacity of the first mobile device 2000-1 is the predetermined value or less, and the remaining battery capacity of the second mobile device 2000-2 is the predetermined value or greater. In addition, the electronic device 100 may display, on the display unit 281 in the vehicle 1000, an alarm message for informing that charging a battery of the first mobile device 2000-1 is necessary, based on the determination result. The alarm message may include, for example, information about identification information of the first mobile device 2000-1, the remaining battery capacity thereof, a text indicating that charging of the battery is necessary, the number of applications being executed in the first mobile device 2000-1, and the like but is not limited thereto.

Moreover, the electronic device 100 may output an alarm sound for informing that charging the battery of the first mobile device 2000-1 is necessary.

Figure 6:
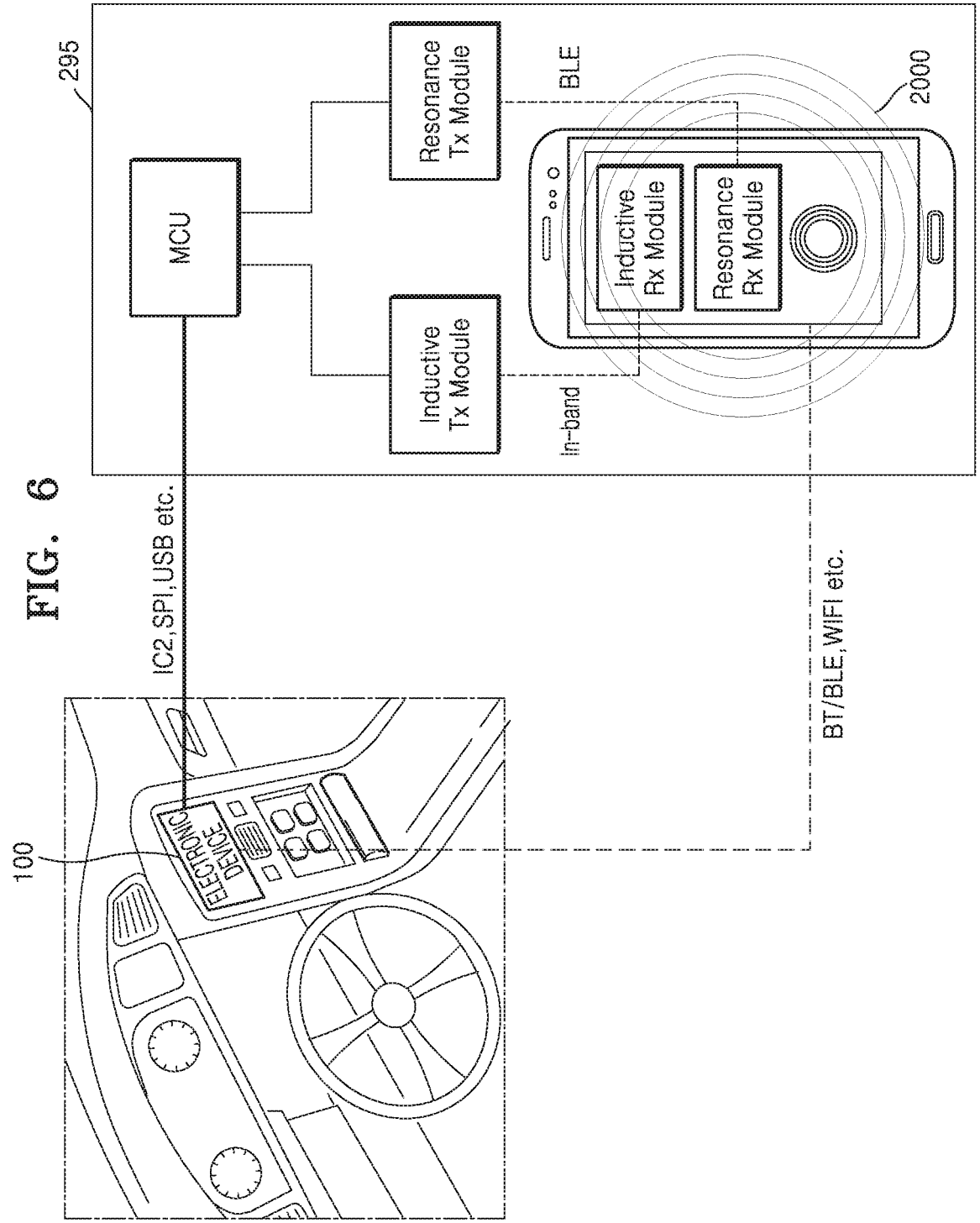
FIG. 6 illustrates an example in which an electronic device directly communicates with a mobile device on a wireless charging device, according to some embodiments.

FIG. 6 illustrates an example in which an electronic device directly communicates with a mobile device on a wireless charging device, according to some embodiments.

Referring to FIG. 6, when an application for interoperating between the electronic device 100 and a mobile device 2000 is pre-installed in the mobile device 2000 to charge the mobile device 2000, the mobile device 2000 may directly communicate with the electronic device 100.

In this case, when the mobile device 2000 is on a wireless charging device 295, the mobile device 2000 may identify that the mobile device 2000 is on the wireless charging device 295. When it is identified that the mobile device 2000 is on the wireless charging device 295, the mobile device 2000 may activate a predetermined short-range communication function under control of the application for the interoperating of the mobile device 2000. In addition, the mobile device 2000 may connect short-range communication with the electronic device 100. The short-range communication may include, for example, Bluetooth communication and Wi-Fi communication but is not limited thereto. In addition, the mobile device 2000 may transmit identification information and state information of the mobile device 2000 to the electronic device 100 through established short-range communication.

The wireless charging device 295 may include a processor (e.g., a micro control unit (MCU)), an inductive transmission (tx) module, and a resonance tx module. When the mobile device 2000 is on the wireless charging device 295, the inductive tx module of the wireless charging device 295 may be connected to the mobile device 2000 through in-band communication, and the resonance tx module of the wireless charging device 295 may be connected to the mobile device 2000 through BLE communication.

The MCU of the wireless charging device 295 may communicate with the electronic device 100 through inter-integrated circuit (I2C) communication, serial peripheral interface (SPI) communication, USB communication, or the like. In addition, the MCU of the wireless charging device 295 may receive a control command from the electronic device 100 and execute an operation of the wireless charging device 295 according to the received control command. The MCU of the wireless charging device 295 may provide information about a charging state of the mobile device 2000 to the electronic device 100.

Figure 7:
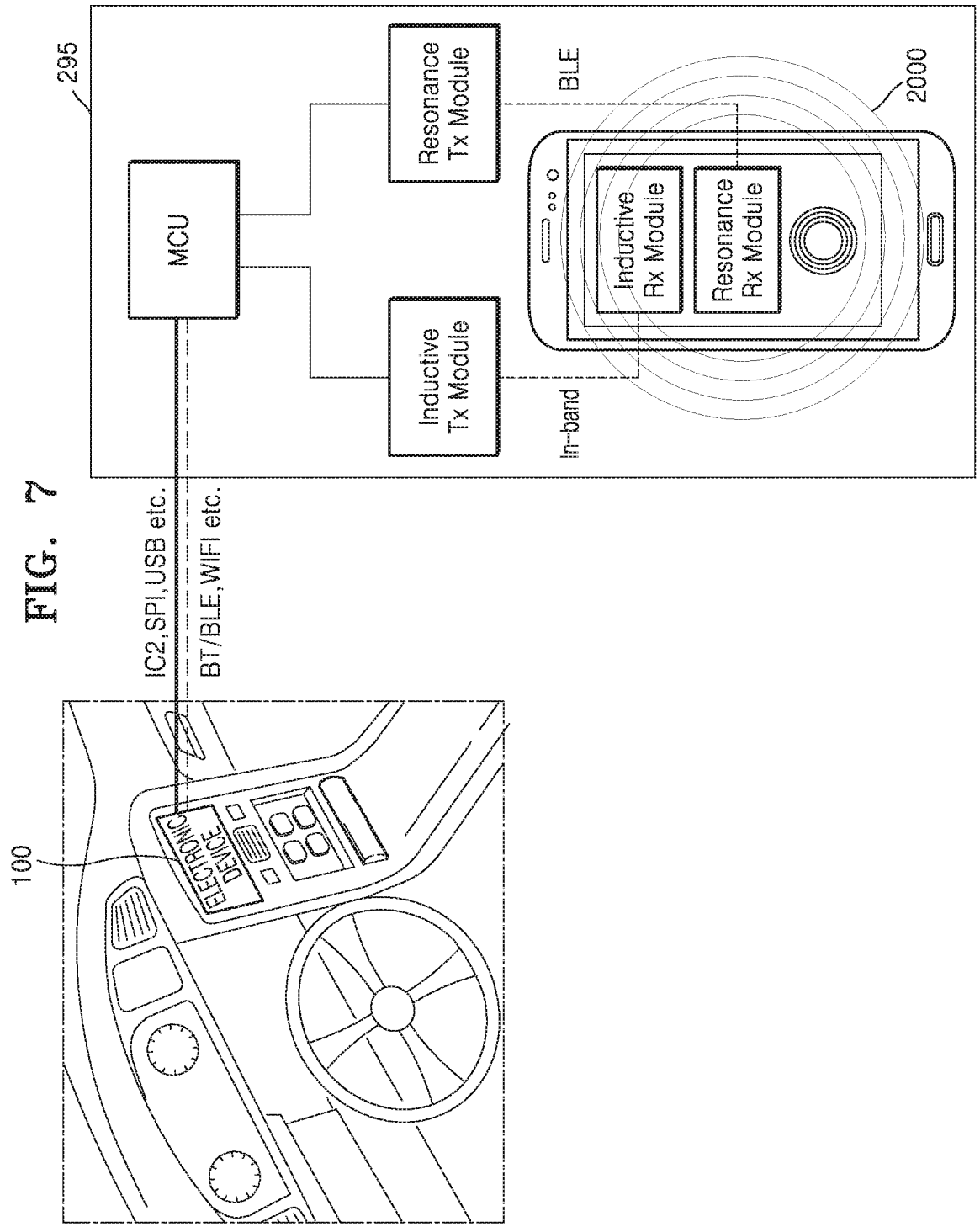
FIG. 7 illustrates an example in which an electronic device communicates through a wireless charging device with a mobile device on the wireless charging device, according to some embodiments.

FIG. 7 illustrates an example in which an electronic device communicates through a wireless charging device with a mobile device on the wireless charging device, according to some embodiments.

Referring to FIG. 7, when the application for interoperating between the electronic device 100 and a mobile device 2000 is not installed in the mobile device 2000, the mobile device 2000 may communicate with the electronic device 100 through a wireless charging device 295.

In this case, when the mobile device 2000 is on the wireless charging device 295, the wireless charging device 295 may identify that the mobile device 2000 is on the wireless charging device 295, and connect communication with the mobile device 2000.

When the mobile device 2000 is on the wireless charging device 295, the inductive tx module of the wireless charging device 295 may be connected to the mobile device 2000 through in-band communication, and the resonance tx module of the wireless charging device 295 may be connected to the mobile device 2000 through BLE communication.

In addition, the MCU of the wireless charging device 295 may communicate with the electronic device 100 through I2C communication, SPI communication, USB communication, Bluetooth communication, Wi-Fi communication, or the like.

The wireless charging device 295 may receive identification information and state information of the mobile device 2000 and provide the same to the electronic device 100. The wireless charging device 295 may receive information about a charging state of the mobile device 2000 and provide the same to the electronic device 100.

Figure 8:
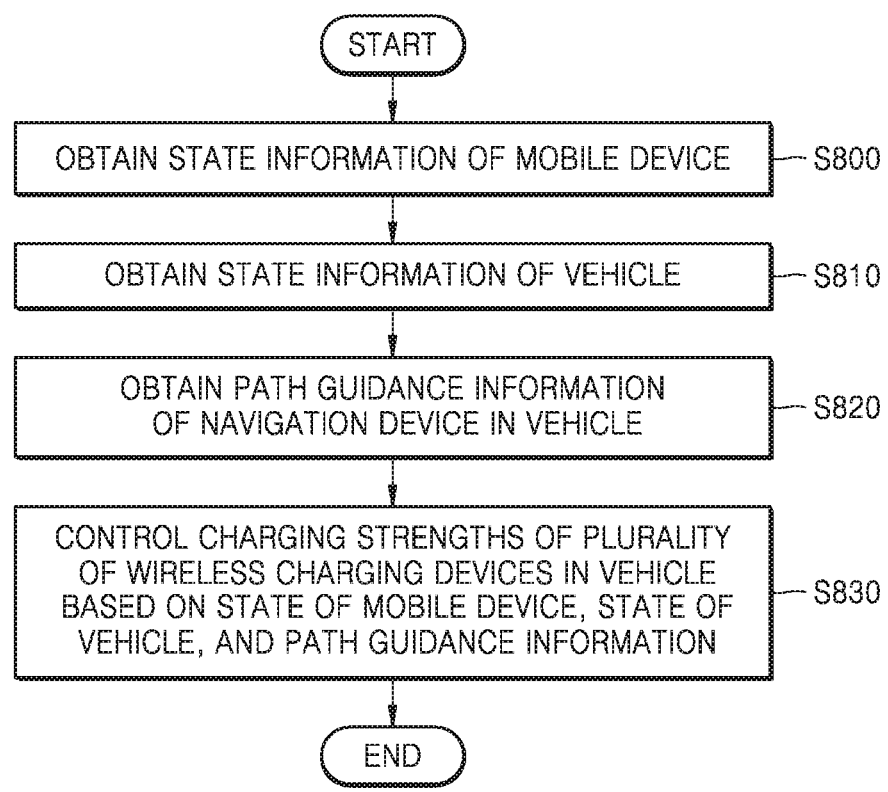
FIG. 8 is a flowchart of a method, performed by an electronic device, of controlling a charging strength of a wireless charging device, according to some embodiments.

FIG. 8 is a flowchart of a method, performed by an electronic device, of controlling a charging strength of a wireless charging device, according to some embodiments.

In operation S800, the electronic device 100 may obtain state information of a mobile device 2000. The electronic device 100 may receive state information of the mobile device 2000 from the mobile device 2000. The state information of the mobile device 2000 may be related to a remaining capacity of a battery of the mobile device 2000. The state information of the mobile device 2000 may include, for example, information about a remaining battery capacity, a current power consumption amount, the number of applications being executed, and the like but is not limited thereto.

In operation S810, the electronic device 100 may obtain state information of the vehicle 1000. The state information of the vehicle 1000 may include, for example, information about a voltage of a battery in the vehicle 1000, a current power consumption amount of the vehicle 1000, and a traveling speed of the vehicle 1000. In addition, the state information of the vehicle 1000 may include information about whether a user has sat on a seat of the vehicle 1000. In this case, a predetermined sensor may be at the seat of the vehicle 1000, and the electronic device 100 may detect whether the user has sat on the seat, based on sensing information generated by the sensor.

In operation S820, the electronic device 100 may obtain path guidance information of a navigation device (not shown) in the vehicle 1000. The navigation device (not shown) may be embedded in the vehicle 1000. Alternatively, the navigation device may be the mobile device 2000 in the vehicle 1000. The navigation device may guide a path from a current location of the vehicle 1000 to a destination, and the electronic device 100 may receive path guidance information about the path to the destination from the navigation device (not shown). The electronic device 100 may obtain information about a predicted time of arrival at the destination.

In operation S830, the electronic device 100 may control charging strengths of a plurality of wireless charging devices 295 in the vehicle 1000 based on a state of the mobile device 2000, a state of the vehicle 1000, and the path guidance information. For example, the electronic device 100 may adjust a charging strength of a wireless charging device 295 by considering a remaining battery capacity and a battery consumption speed of the mobile device 2000, and a current power consumption amount and a traveling speed of the vehicle 1000. The electronic device 100 may determine a charging speed on whether to charge the battery of the mobile device 2000 at a high or low speed, by considering a remaining battery capacity and a battery consumption speed of the mobile device 2000, and a current power consumption amount and a traveling speed of the vehicle 1000.

The electronic device 100 may adjust a charging strength of the wireless charging device 295 based on the determined charging speed. The electronic device 100 may provide information about the charging strength to the wireless charging device 295 such that the wireless charging device 295 charges the mobile device 2000 at a charging strength of a predetermined value.

Alternatively, the electronic device 100 may change the charging strength of the wireless charging device 295 by changing a charging mode of the wireless charging device 295. In this case, the charging mode of the wireless charging device 295 may include, for example, a high-speed charging mode and a low-speed charging mode.

Alternatively, the electronic device 100 may differently adjust a charging strength of the first wireless charging device 295-1 at the front seats of the vehicle 1000 and a charging strength of the second wireless charging device 295-2 at the back seats of the vehicle 1000.

Alternatively, the electronic device 100 may adjust the charging strength of the wireless charging device 295 based on the number of mobile devices 2000 in the vehicle 1000. For example, when the number of mobile devices 2000 of which a battery is needed to be charged is a preset number or greater, the electronic device 100 may adjust the charging strength of the wireless charging device 295 to be strong. The electronic device 100 may differently adjust the charging strength of the first wireless charging device 295-1 at the front seats of the vehicle 1000 and the charging strength of the second wireless charging device 295-2 at the back seats of the vehicle 1000 based on the number of mobile devices 2000 at the front seats of the vehicle 1000 and the number of mobile devices 2000 at the back seats of the vehicle 1000, respectively.

Figure 9:
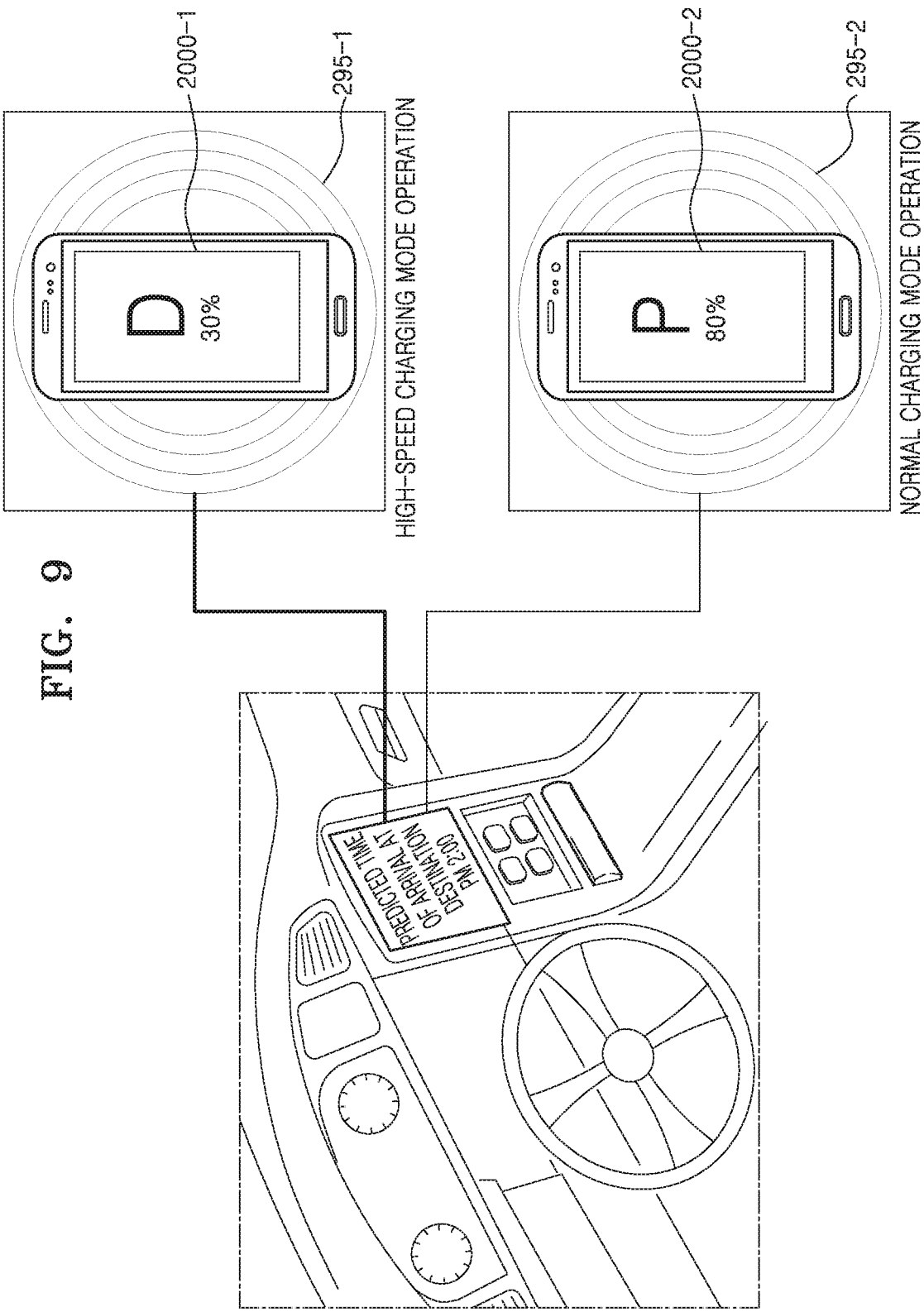
FIG. 9 illustrates an example in which an electronic device controls a charging strength of a wireless charging device based on a predicted time of arrival at a destination, according to some embodiments.

FIG. 9 illustrates an example in which an electronic device controls a charging strength of a wireless charging device based on a predicted time of arrival at a destination, according to some embodiments.

Referring to FIG. 9, the electronic device 100 may obtain information about a predicted time of arrival at a destination from a navigation device (not shown) of the vehicle 1000. In addition, the electronic device 100 may obtain a time to be taken from a current location to the destination.

The electronic device 100 may adjust a charging strength of the first wireless charging device 295-1 for charging the first mobile device 2000-1 in the vehicle 1000 by considering the time to be taken from the current location to the destination and a remaining battery capacity of the first mobile device 2000-1 in the vehicle 1000. In this case, the electronic device 100 may compare the time to be taken from the current location to the destination to a time to be taken to complete charging of a battery to control the first wireless charging device 295-1 such that the first wireless charging device 295-1 operates in the high-speed charging mode.

In addition, the electronic device 100 may adjust a charging strength of the second wireless charging device 295-2 for charging the second mobile device 2000-2 in the vehicle 1000 by considering the time to be taken from the current location to the destination and a remaining battery capacity of the second mobile device 2000-2 in the vehicle 1000. In this case, the electronic device 100 may compare the time to be taken from the current location to the destination to a time to be taken to complete charging of a battery to control the second wireless charging device 295-2 such that the second wireless charging device 295-2 operates in the high-speed charging mode.

Alternatively, the electronic device 100 may adjust the charging strength of the first wireless charging device 295-1 at the front seats of the vehicle 1000 by considering a predicted arrival time, and the number and remaining battery capacities of mobile devices 2000 at the front seats of the vehicle 1000.

The electronic device 100 may adjust the charging strength of the second wireless charging device 295-2 at the back seats of the vehicle 1000 by considering the predicted arrival time, and the number and remaining battery capacities of mobile devices 2000 at the back seats of the vehicle 1000.

Figure 10:
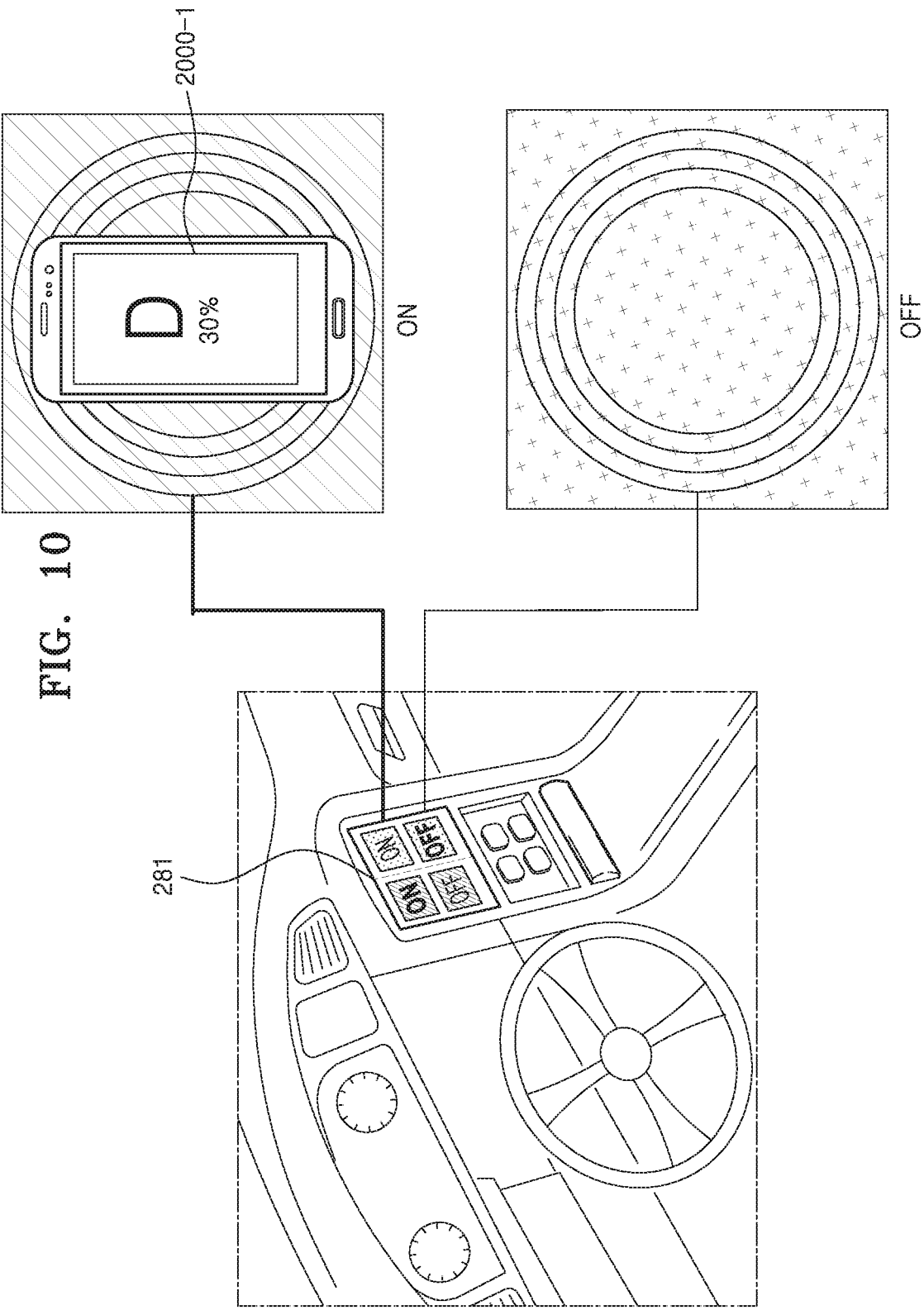
FIG. 10 illustrates an example in which an electronic device displays a graphical user interface (GUI) for controlling an operation of a wireless charging device, according to some embodiments.

FIG. 10 illustrates an example in which an electronic device displays a graphical user interface (GUI) for controlling an operation of a wireless charging device, according to some embodiments.

Referring to FIG. 10, the electronic device 100 may display, on the display unit 281 in the vehicle 1000, a GUI for individually controlling an operation of the first wireless charging device 295-1 at the front seats of the vehicle 1000 and an operation of the second wireless charging device 295-2 at the back seats of the vehicle 1000. Through the GUI displayed on the display unit 281, a user may make a user input for controlling power, charging strengths, and the like of the first wireless charging device 295-1 and the second wireless charging device 295-2.

Figure 11:
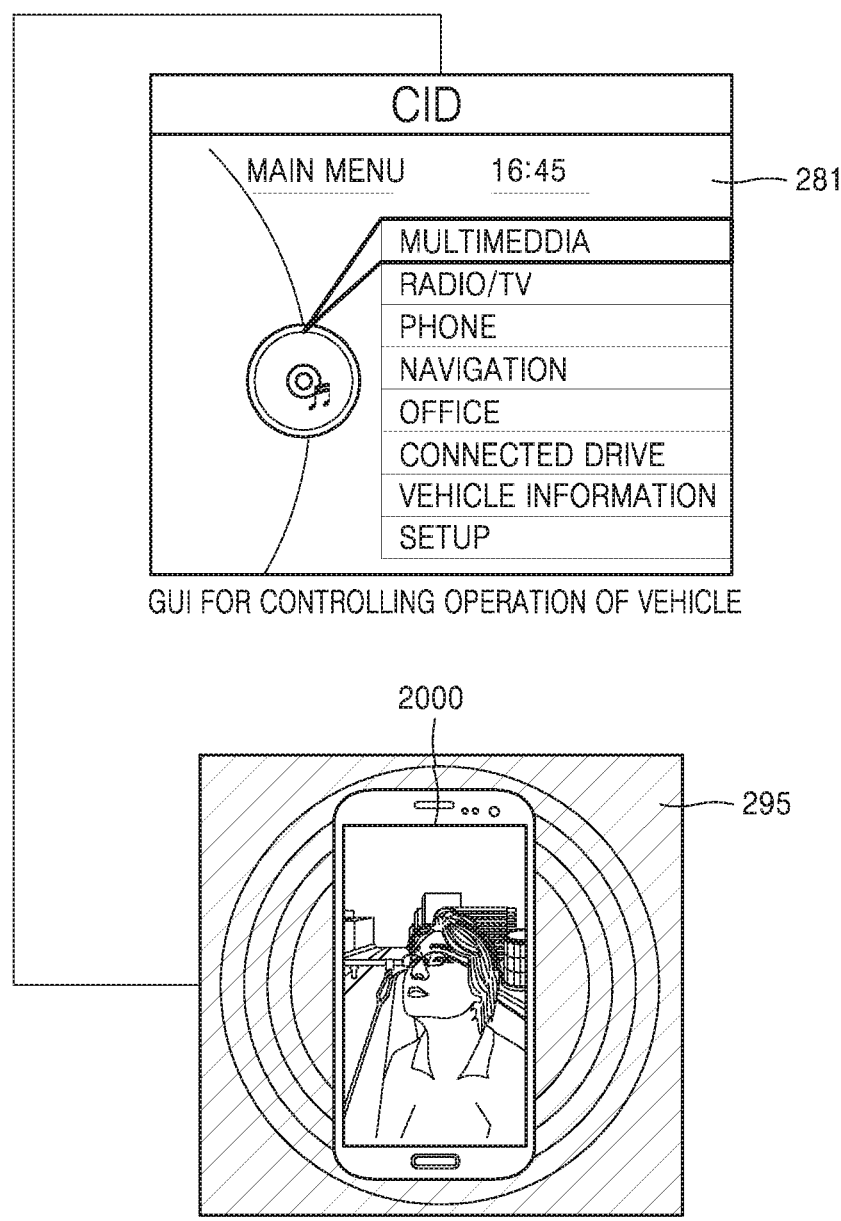
FIGS. 11 and 12 illustrate examples in which an electronic device displays a different GUI according to how a mobile device is on a wireless charging device, according to some embodiments.
Figure 12:
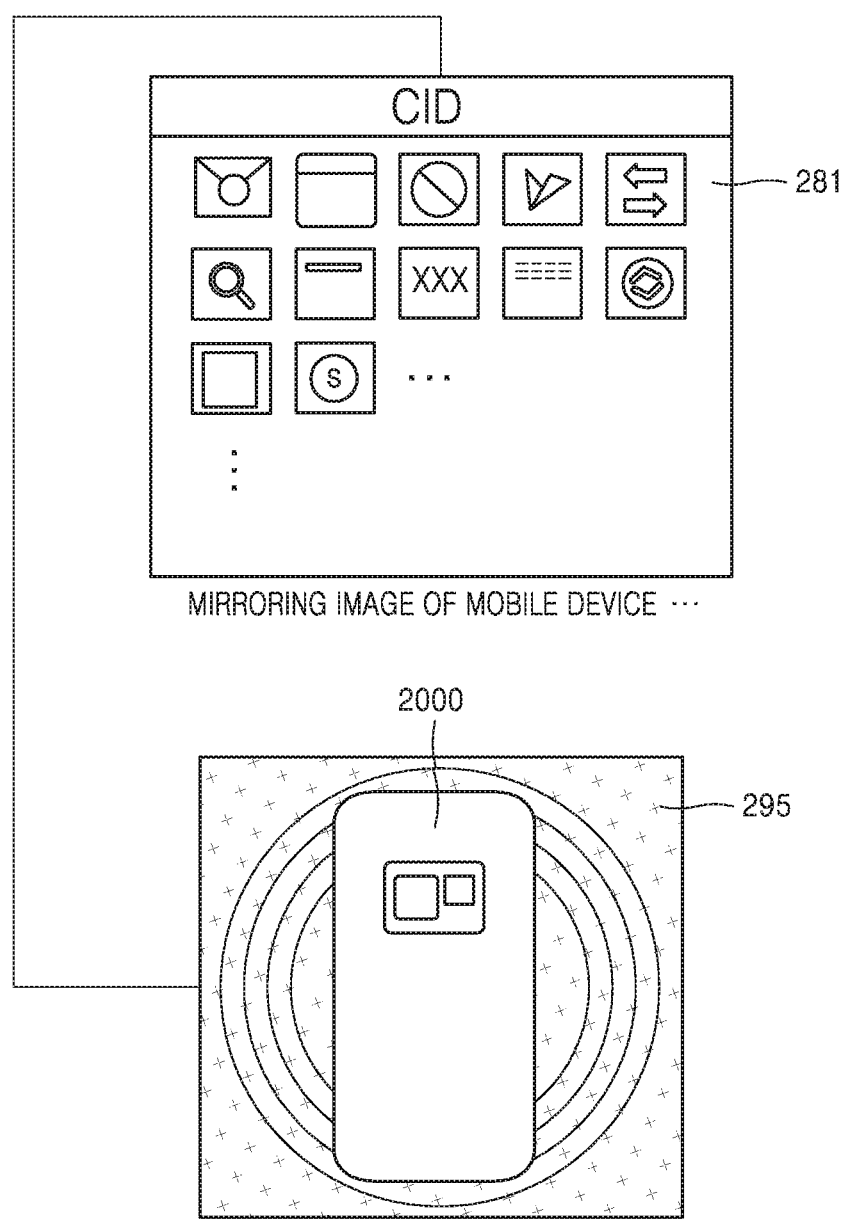

FIGS. 11 and 12 illustrate examples in which an electronic device displays a different GUI according to how a mobile device is on a wireless charging device, according to some embodiments.

Referring to FIG. 11, a mobile device 2000 may be on a wireless charging device 295 such that a screen of the mobile device 2000 is viewed by a user. In this case, the mobile device 2000 may determine where the screen of the mobile device 2000 is oriented, as soon as the mobile device 2000 is on the wireless charging device 295. The mobile device 2000 may determine where the screen of the mobile device 2000 on the wireless charging device 295 is oriented, by using, for example, an illumination sensor or a gravity sensor.

In addition, when the mobile device 2000 determines that the mobile device 2000 is on the wireless charging device 295 such that the screen of the mobile device 2000 is viewed by the user, the mobile device 2000 may provide, to the electronic device 100, information informing that the mobile device 2000 is on the wireless charging device 295 such that the screen of the mobile device 2000 is viewed by the user. In addition, the electronic device 100 may identify that the mobile device 2000 is on the wireless charging device 295 such that the screen of the mobile device 2000 is viewed by the user, based on the information received from the mobile device 2000. In addition, the electronic device 100 may display, on the display unit 281 in the vehicle 1000, a GUI for controlling an operation of the vehicle 1000.

Referring to FIG. 12, the mobile device 2000 may be on the wireless charging device 295 such that the screen of the mobile device 2000 is not viewed by the user. In this case, the mobile device 2000 may determine where the screen of the mobile device 2000 is oriented, as soon as the mobile device 2000 is on the wireless charging device 295. The mobile device 2000 may determine where the screen of the mobile device 2000 on the wireless charging device 295 is oriented.

In addition, the mobile device 2000 may determine that the screen of the mobile device 2000 is oriented to the wireless charging device 295 such that the screen of the mobile device 2000 is not viewed by the user. In this case, the mobile device 2000 may provide, to the electronic device 100, information informing that the mobile device 2000 is on the wireless charging device 295 such that the screen of the mobile device 2000 is not viewed by the user. In addition, the electronic device 100 may identify that the mobile device 2000 is on the wireless charging device 295 such that the screen of the mobile device 2000 is not viewed by the user, based on the information received from the mobile device 2000. In addition, the electronic device 100 may display, on the display unit 281 in the vehicle 1000, a mirroring screen image of the mobile device 2000.

Figure 13:
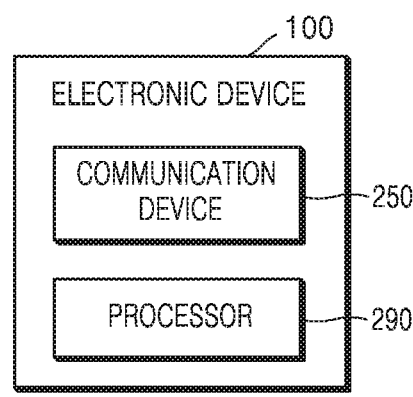
FIG. 13 is a hardware block diagram of an electronic device according to some embodiments.
Figure 14:
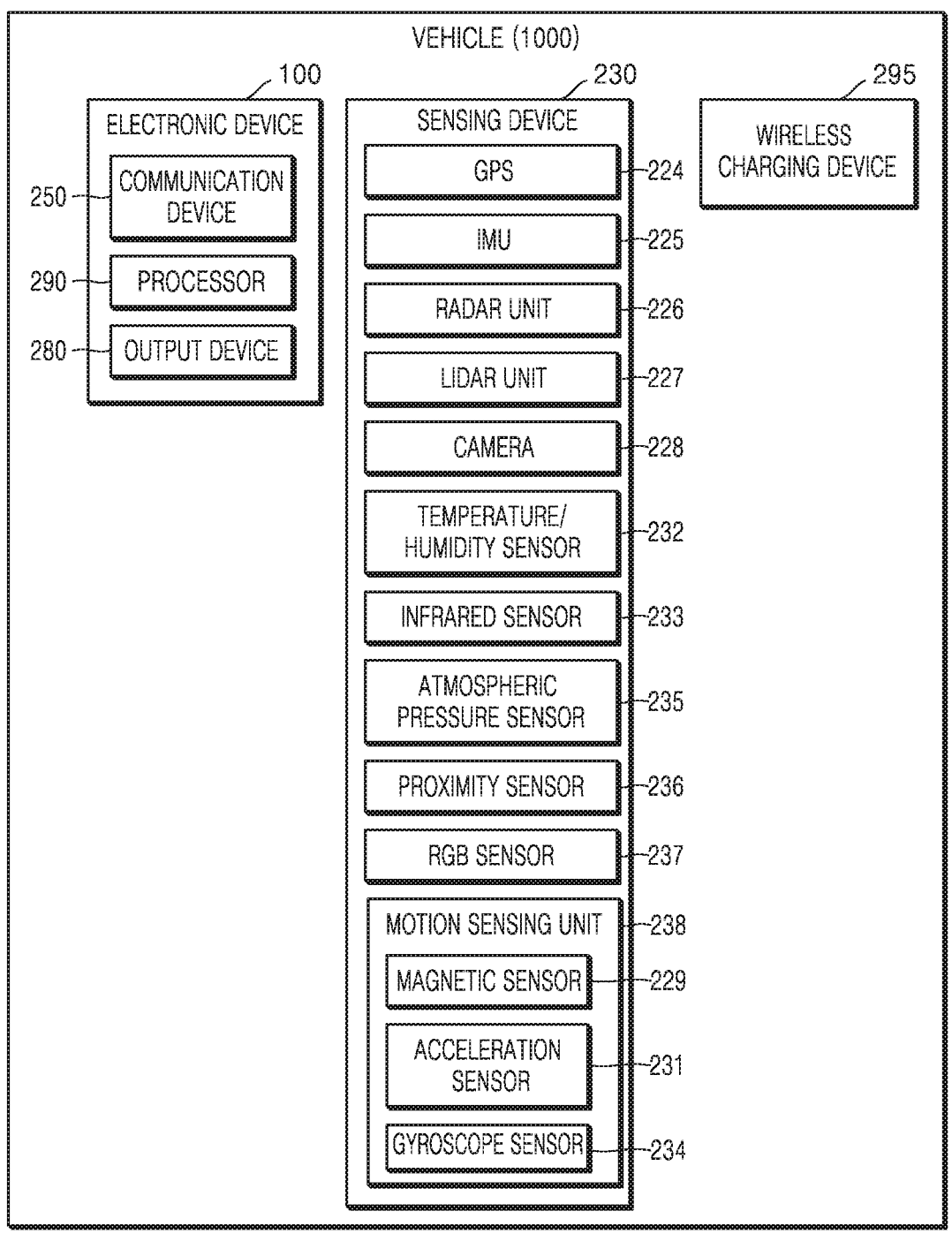
FIGS. 14 and 15 are block diagrams of the electronic device and hardware of a vehicle, according to some embodiments.
Figure 15:
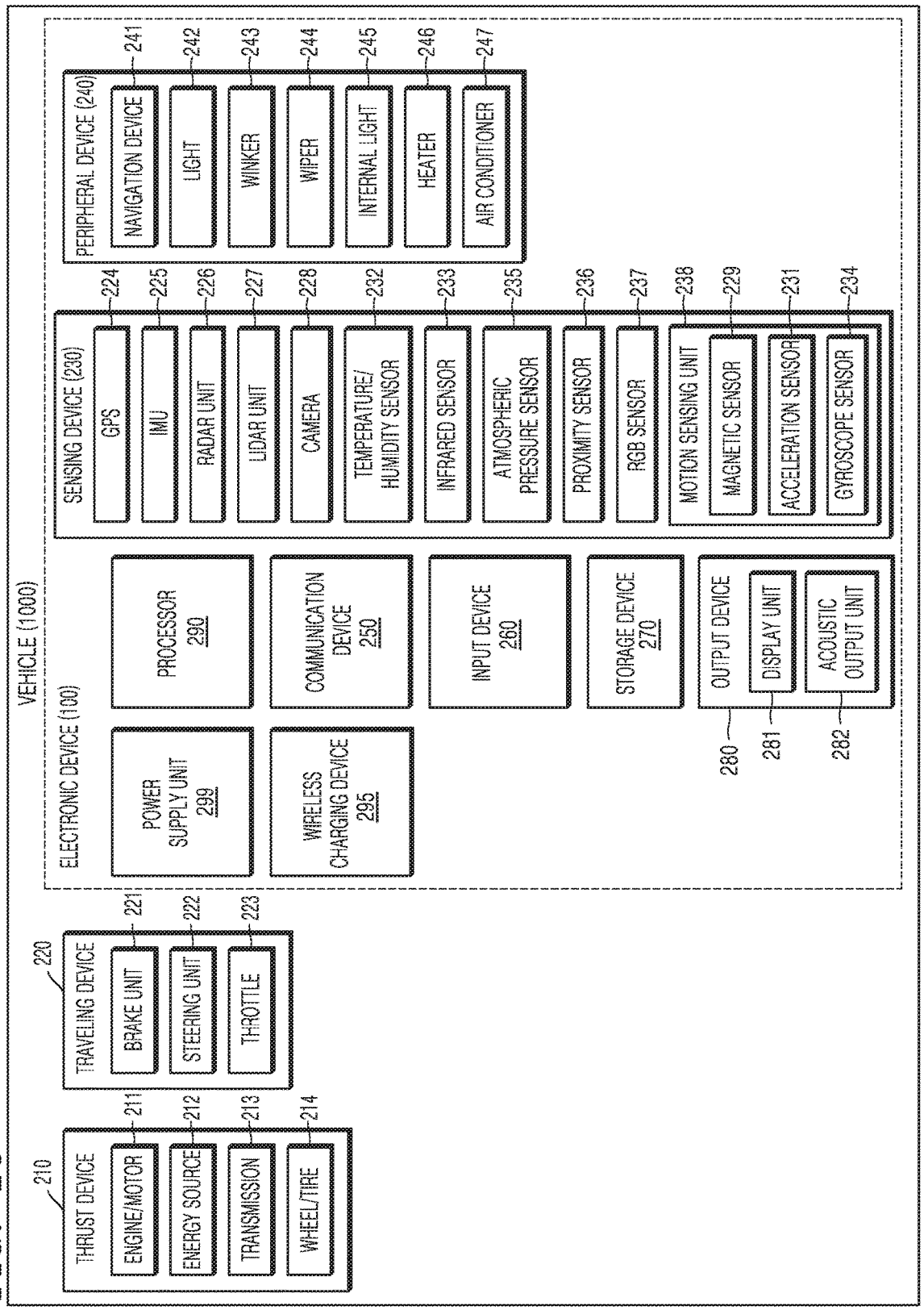

FIG. 13 is a hardware block diagram of an electronic device according to some embodiments, and FIGS. 14 and 15 are block diagrams of the electronic device and hardware of a vehicle, according to some embodiments.

As shown in FIG. 13, the electronic device 100 according to some embodiments may include a communication device 250 and a processor 290. However, all of the components shown in FIG. 13 are not essential components. The electronic device 100 may be implemented by more or less components than the components shown in FIG. 13. For example, as shown in FIGS. 14 and 15, the electronic device 100 according to some embodiments may further include at least one of a power supply unit 299, a communication device 250, an input device 260, a storage device 270, a peripheral device 240, and an output device 280. In addition, the vehicle 1000 may include a thrust device 210 and a traveling device 220 as shown in FIG. 15 but is not limited thereto, and the vehicle 1000 may include some of the components of the electronic device 100. In addition, the electronic device 100 may be a different device having the components of the electronic device 100 shown in FIG. 14, and in this case, the electronic device 100 may be connected through communication to the head unit in the vehicle 1000 to control a wireless charging device 295 in the vehicle 1000.

Hereinafter, the functions of components which may be included in the vehicle 1000 and the electronic device 100 may be described in more detail with reference to FIGS. 13 to 15.

The thrust device 210 may include an engine/motor 211, an energy source 212, a transmission 213, and wheels/tires 214.

The engine/motor 211 may include an arbitrary combination of a combustion engine, an electric motor, a steam engine, and a Stirling engine. For example, when the vehicle 1000 is a gas-electric hybrid car, the engine/motor 211 may include a gasoline engine and an electric motor.

The energy source 212 may be a supply source of energy, which entirely or partially provides motive power. That is, the engine/motor 211 may be configured to convert the energy source 212 into mechanical energy. Examples of the energy source 212 may include at least one of gasoline, diesel, propane, other compressed gas-based fuels, ethanol, a solar panel, a battery, and other electric power sources. Alternatively, the energy source 212 may include at least one of a fuel tank, a battery, a capacitor, and a flywheel. The energy source 212 may provide energy to a system and a device in the vehicle 1000.

The transmission 213 may be configured to deliver mechanical power from the engine/motor 211 to the wheels/tires 214. For example, the transmission 213 may include at least one of a gearbox, a clutch, a differential, and a driving shaft. When the transmission 213 includes driving shafts, the driving shafts may include one or more axles configured to be coupled to the wheels/tires 214.

The wheels/tires 214 may be configured in various forms including a unicycle form, a bicycle/motorcycle form, a tricycle form, or a vehicle/truck form. For example, another wheel/tire form such as including six or more wheels may be possible. The wheels/tires 214 may include at least a wheel fixedly attached to the transmission 213 and at least one tire coupled to a rim of a wheel, which may be in contact with a driving surface.

The traveling device 220 may include a brake unit 221, a steering unit 222, and a throttle 223. The brake unit 221 may be a set of mechanisms configured to decelerate the vehicle 1000 For example, the brake unit 221 may use friction to reduce a speed of the wheels/tires 214. The steering unit 222 may be a set of mechanisms configured to adjust a direction of the vehicle 1000. The throttle 223 may be a set of mechanisms configured to control a speed of the vehicle 1000 by controlling an operating speed of the engine/motor 211. In addition, the throttle 223 may adjust a throttle open rate to adjust a mixed gas volume of fuel air flowing in the engine/motor 211 and may adjust a throttle open rate to adjust motive power and thrust.

The sensing device 230 may include a plurality of sensors configured to detect information about an environment where the vehicle 1000 is located and include one or more actuators configured to correct locations and/or orientations of the sensors. For example, the sensing device 230 may include a global positioning system (GPS) 224, an inertial measurement unit (IMU) 225, a radio detection and ranging (RADAR) unit 226, a light detection and ranging (LIDAR) unit 227, and a camera 228. In addition, the sensing device 230 may include at least one of a temperature/humidity sensor 232, an infrared sensor 233, an atmospheric pressure sensor 235, a proximity sensor 236, and an RGB (illuminance) sensor 237 but is not limited thereto. A function of each sensor may be intuitively inferred by those of ordinary skill in the art from a name thereof, and thus a detailed description thereof is omitted herein.

In addition, the sensing device 230 may include a motion sensing device 238 capable of sensing a motion of the vehicle 1000. The motion sensing device 238 may include a magnetic sensor 229, an acceleration sensor 231, and a gyroscope sensor 234.

The GPS 224 may be configured to estimate a geographical location of the vehicle 1000. That is, the GPS 224 may include a transceiver configured to estimate a location of the vehicle 1000 on the Earth.

The IMU 225 may be a set of sensors configured to detect changes in a location and an orientation of the vehicle 1000 based on an inertial acceleration. For example, the set of sensors may include accelerometers and gyroscopes.

The RADAR unit 226 may be configured to detect objects around the vehicle 1000 by using a radio signal. In addition, the RADAR unit 226 may be configured to detect speeds and/or directions of the objects.

The LIDAR unit 227 may be configured to detect objects around the vehicle 1000 by using a laser. More particularly, the LIDAR unit 227 may include a laser light source and/or a laser scanner configured to emit a laser beam and a detector configured to detect reflection of the laser beam. The LIDAR unit 227 may be configured to operate in a coherent (e.g., using heterodyne detection) or incoherent detection mode.

The camera 228 may be a still camera or a video camera configured to photograph the inside or outside of the vehicle 1000. For example, when the camera 228 includes a plurality of cameras, the plurality of cameras 228 may be arranged at a plurality of locations inside and outside the vehicle 1000.

In addition, the camera 228 may be provided to photograph a seat part of the vehicle 1000, and when a user sits on a seat, the camera 228 may photograph the user such that the electronic device determines whether the user has sat on the seat, based on a captured image.

In addition, the sensing device 230 may include a pressure sensor (not shown), and the pressure sensor (not shown) may be provided to the seat part of the vehicle 1000. In this case, the pressure sensor (not shown) may detect a strength and a strength change of pressure applied to the pressure sensor (not shown) by a body of the user when the user sits on the seat.

In addition, the sensing device 230 may include a photosensor (not shown), and the photosensor (not shown) may be provided to emit light toward a seat of the vehicle 1000. In this case, the photosensor (not shown) may generate a sensing signal to be used to determine based on the emitted light whether the user has sat on the seat.

The peripheral device 240 may include a navigation device 241, a light 242, a winker 243, a wiper 244, an internal light 245, a heater 246, and an air conditioner 247.

The navigation device 241 may be configured to determine a traveling path of the vehicle 1000. The navigation device 241 may be configured to dynamically update the traveling path while the vehicle 1000 is traveling. For example, the navigation device 241 may use data from the GPS 224 and maps to determine the traveling path of the vehicle 1000. The navigation device 241 may not be a separate device from the electronic device 100, and the electronic device 100 may perform a function of the navigation device 241.

The storage device 270 may include a magnetic disc drive, an optical disc drive, and a flash memory. Alternatively, the storage device 270 may be a portable USB data storage device. The storage device 270 may store system software for executing examples related to the present application. The system software for executing examples related to the present application may be stored in a portable storage medium.

The communication device 250 may include at least one antenna for communicating with another device in a wireless manner. For example, the communication device 250 may be used to communicate with a cellular network or another wireless protocol and system in a wireless manner through Wi-Fi or Bluetooth. The communication device 250 controlled by the processor 290 may transmit and receive a wireless signal. For example, the processor 290 may execute a program stored in the storage device 270, such that the communication device 250 transmits and receives a wireless signal to and from a cellular network.

The communication device 250 may perform a communication connection with a mobile device 2000 and a wireless charging device 295 through a predetermined communication scheme.

The input device 260 indicates a means for inputting data for controlling the vehicle 1000. For example, the input device 260 may include a key pad, a dome switch, a touch pad (a capacitive overlay touch pad, a resistive overlay touch pad, an infrared beam touch pad, a surface acoustic wave touch pad, an integral strain gauge touch pad, a piezoelectric touch pad, or the like), a jog wheel, a jog switch, and the like but is not limited thereto. In addition, the input device 260 may include a microphone, wherein the microphone may be configured to receive audio (e.g., a voice command) from a passenger of the vehicle 1000.

The output device 280 may output an audio signal or a video signal, and the output device 280 may include the display unit 281 and the acoustic output unit 282.

The display unit 281 may include at least one of a liquid crystal display, a thin film transistor-liquid crystal display, an organic light-emitting diode display, a flexible display, a three-dimensional (3D) display, and an electrophoretic display. In addition, according to an implementation form of the output device 280, the output device 280 may include two or more display units 281.

The acoustic output unit 282 outputs audio data received from the communication device 250 or stored in the storage device 270. In addition, the acoustic output unit 282 may include a speaker, a buzzer, and the like.

The input device 260 and the output device 280 may include a network interface and may be implemented by a touch screen.

The processor 290 may commonly control a general operation of the vehicle 1000. For example, the processor 290 may generally control at least one of the thrust device 210, the traveling device 220, the sensing device 230, the peripheral device 240, the communication device 250, the input device 260, the storage device 270, the output device 280, and the power supply unit 299 by executing programs stored in the storage device 270.

The processor 290 may control an operation of the electronic device 100 of FIGS. 1 to 12 by executing programs stored in the storage device 270.

The processor 290 may control an operation of a wireless charging device 295 in the vehicle 1000 considering a state of a mobile device 2000 in the vehicle 1000 and a state of the vehicle 1000 by executing programs stored in the storage device 270.

The processor 290 may connect communication between at least one mobile device 2000 in the vehicle 1000 and the electronic device 100 by controlling the communication device 250. The processor 290 may connect communication between the at least one mobile device 2000 in the vehicle 1000 and the electronic device 100 by using a preset short-range communication scheme.

The processor 290 may identify the at least one mobile device 2000 connected thereto through communication. The processor 290 may identify the mobile device 2000 in the vehicle 1000 by receiving identification information from the at least one mobile device 2000 connected thereto through communication.

The processor 290 may obtain state information of the identified mobile device 2000. The processor 290 may receive the state information of the mobile device 2000 from the mobile device 2000. The state information of the mobile device 2000 may be related to a remaining capacity of a battery of the mobile device 2000. The state information of the mobile device 2000 may include, for example, information about a remaining battery capacity, a current power consumption amount, the number of applications being executed, and the like but is not limited thereto.

The processor 290 may obtain state information of the vehicle 1000. The state information of the vehicle 1000 may include, for example, information about a voltage of a battery in the vehicle 1000, a current power consumption amount of the vehicle 1000, and a traveling speed of the vehicle 1000.

In addition, the state information of the vehicle 1000 may include information about whether a user has sat on a seat of the vehicle 1000. In this case, a predetermined sensor may be at the seat of the vehicle 1000, and the processor 290 may detect whether the user has sat on the seat, based on sensing information generated by the sensor.

The processor 290 may control power of a plurality of wireless charging devices 295 in the vehicle 1000 based on a state of the mobile device 2000 and a state of the vehicle 1000. The processor 290 may select a wireless charging device 295 to be turned on among the plurality of wireless charging devices 295, based on the state of the mobile device 2000 and the state of the vehicle 1000. In addition, the processor 290 may transmit, to the wireless charging device 295, a control signal for turning on power of the selected wireless charging device 295.

The processor 290 may obtain path guidance information of a navigation device 241 in the vehicle 1000. The processor 290 may receive, from the navigation device (not shown 241, path guidance information related to a path to a destination. The processor 290 may obtain information about a predicted time of arrival at the destination.

The processor 290 may control charging strengths of a plurality of wireless charging devices 295 in the vehicle 1000 based on a state of the mobile device 2000, a state of the vehicle 1000, and the path guidance information. For example, the processor 290 may adjust a charging strength of a wireless charging device 295 by considering a remaining battery capacity and a battery consumption speed of the mobile device 2000, and a current power consumption amount and a traveling speed of the vehicle 1000. The processor 290 may determine a charging speed on whether to charge the battery of the mobile device 2000 at a high or low speed, by considering a remaining battery capacity and a battery consumption speed of the mobile device 2000, and a current power consumption amount and a traveling speed of the vehicle 1000. The processor 290 may adjust a charging strength of the wireless charging device 295 based on the determined charging speed. The processor 290 may provide information about the charging strength to the wireless charging device 295 such that the wireless charging device 295 charges the mobile device 2000 at a charging strength of a predetermined value. Alternatively, the processor 290 may change the charging strength of the wireless charging device 295 by changing a charging mode of the wireless charging device 295. In this case, the charging mode of the wireless charging device 295 may include, for example, the high-speed charging mode and the low-speed charging mode.

Alternatively, the processor 290 may differently adjust a charging strength of the first wireless charging device 295-1 at the front seats of the vehicle 1000 and a charging strength of the second wireless charging device 295-2 at the back seats of the vehicle 1000.

Alternatively, the processor 290 may adjust the charging strength of the wireless charging device 295 based on the number of mobile devices 2000 in the vehicle 1000. For example, when the number of mobile devices 2000 of which a battery is needed to be charged is a preset number or greater, the processor 290 may adjust the charging strength of the wireless charging device 295 to be strong. The processor 290 may differently adjust the charging strength of the first wireless charging device 295-1 at the front seats of the vehicle 1000 and the charging strength of the second wireless charging device 295-2 at the back seats of the vehicle 1000 based on the number of mobile devices 2000 at the front seats of the vehicle 1000 and the number of mobile devices 2000 at the back seats of the vehicle 1000, respectively.

The power supply unit 299 may be configured to provide power to some or all of the components of the vehicle 1000. For example, the power supply unit 299 may include a rechargeable lithium-ion or lead-acid battery.

Figure 16:
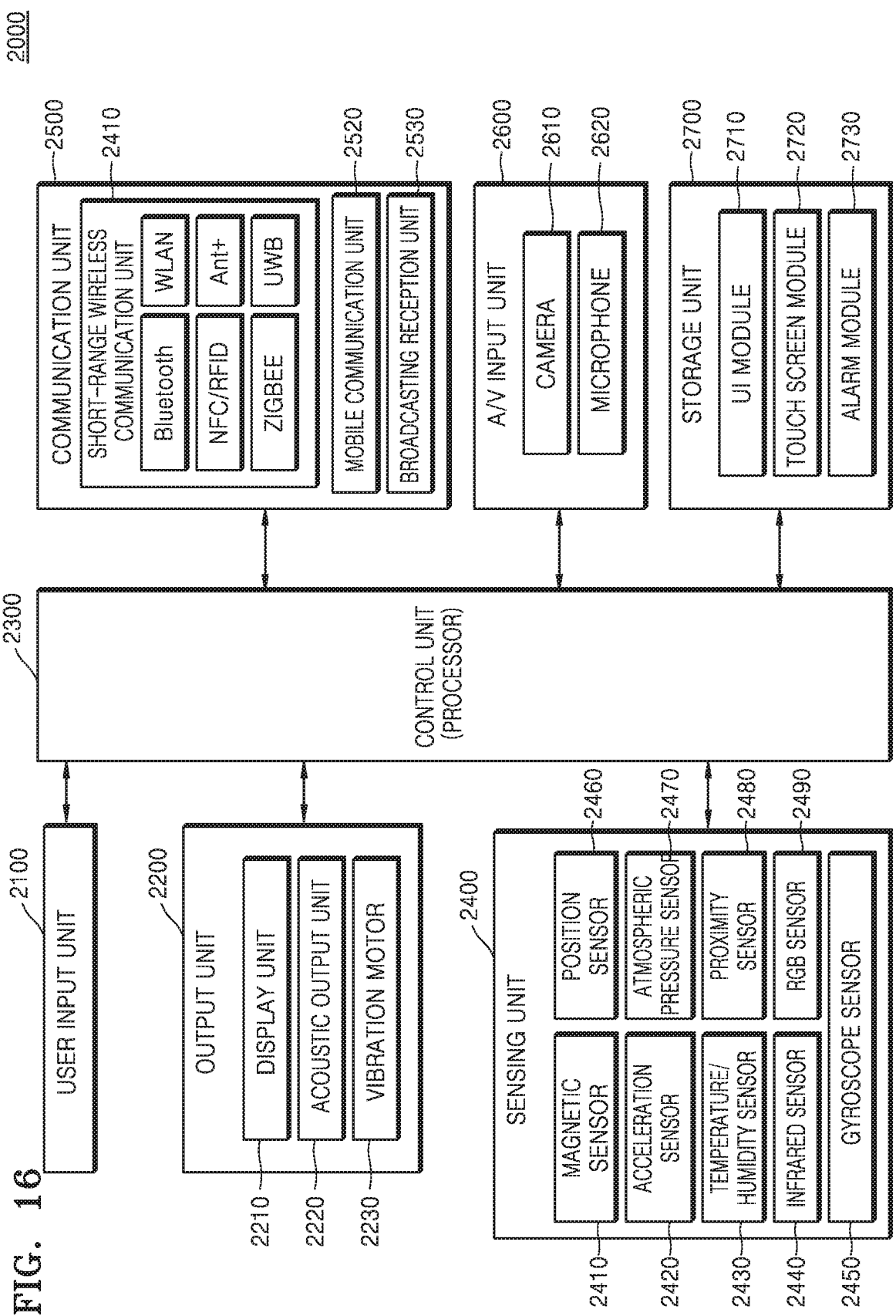
FIG. 16 is a block diagram of a mobile device.

FIG. 16 is a block diagram of a mobile device 2000.

As shown in FIG. 16, the mobile device 2000 according to some embodiments may include a user input unit 2100, an output unit 2200, a control unit 2300, a sensing unit 2400, a communication unit 2500, an audio/video (NV) input unit 2600, and a memory 2700.

However, all of the components shown in FIG. 16 are not essential components. The mobile device 2000 may be implemented by more or less components than the components shown in FIG. 16.

The user input unit 2100 may indicate a means through which a user inputs data for controlling the mobile device 2000. For example, the user input unit 2100 may include a keypad, a dome switch, a touch pad (a capacitive overlay touch pad, a resistive overlay touch pad, an infrared beam touch pad, a surface acoustic wave touch pad, an integral strain gauge touch pad, a piezoelectric touch pad, or the like), a jog wheel, a jog switch, and the like but is not limited thereto.

The output unit 2200 may output an audio signal, a video signal, or a vibration signal and may include a display unit 2210, an acoustic output unit 2220, and a vibration motor 2230.

The display unit 2210 displays information processed by the mobile device 2000. When the display unit 2210 and a touch pad form a layer structure to configure a touchscreen, the display unit 2210 may be used as not only an output device but also an input device.

The acoustic output unit 2220 may output audio data received through the communication unit 2500 or stored in the memory 1700. In addition, the acoustic output unit 2220 may output an acoustic signal related to a function (e.g., a call signal reception sound, a message reception sound, or an alarm sound) performed by the mobile device 2000. The acoustic output unit 2220 may include a speaker, a buzzer, and the like.

The vibration motor 2230 may output a vibration signal. For example, the vibration motor 2230 may output a vibration signal corresponding to an output of audio data or video data (e.g., a call signal reception sound, a message reception sound, or the like). In addition, the vibration motor 2230 may output a vibration signal when a touch is input through the touchscreen.

The control unit 2300 may commonly control a general operation of the mobile device 2000. For example, the control unit 2300 may generally control the user input unit 2100, the output unit 2200, the sensing unit 2400, the communication unit 2500, the A/V input unit 2600, and the like by executing programs stored in the memory 2700. In addition, the control unit 2300 may control an operation of the mobile device 2000 of FIGS. 1 to 12 by executing programs stored in the memory 2700.

The sensing unit 2400 may detect a state of the mobile device 2000 or an ambient state of the mobile device 2000 and transmit the detected information to the control unit 2300.

The sensing unit 2400 may include at least one of a magnetic sensor 2410, an acceleration sensor 2420, a temperature/humidity sensor 2430, an IR sensor 2440, a gyroscope sensor 2450, a position sensor (e.g., GPS) 2460, an atmospheric pressure sensor 2470, a proximity sensor 2480, and an RGB (illuminance) sensor 2490 but is not limited thereto. A function of each sensor may be intuitively inferred by those of ordinary skill in the art from a name thereof, and thus a detailed description thereof is omitted herein.

The communication unit 1500 may include at least one component for communicating with the electronic device 100 and the wireless charging device 295. For example, the communication unit 1500 may include a short-range wireless communication unit 2510, a mobile communication unit 2520, and a broadcast reception unit 2530.

The short-range wireless communication unit 2510 may include a Bluetooth communication unit, a BLE communication unit, a near-field communication unit, a wireless local area network (WLAN) (Wi-Fi) communication unit, a ZigBee communication unit, an IrDA communication unit, a WFD communication unit, a UWB communication unit, an Ant+ communication unit, and the like but is not limited thereto.

The A/V input unit 2600 is to input an audio signal or a video signal and may include a camera 2610, a microphone 2620, and the like. An image frame processed by the camera 2610 may be stored in the memory 2700 or transmitted to the outside through the communication unit 2500. Two or more cameras 2610 may be provided according to a configuration aspect of a terminal.

The microphone 2620 receives an external acoustic signal and processes the external acoustic signal into electrical voice data.

The memory 2700 may store programs for processing and control of the control unit 2300 and store data input to the mobile device 2000 or output from the mobile device 2000.

The memory 2700 may include at least one type of storage medium among a flash memory type memory, a hard disk type memory, a multimedia card micro type memory, a card type memory (e.g., a secure digital (SD) or extreme digital (XD) memory), random access memory (RAM), static RAM (SRAM), read only memory (ROM), electrically erasable programmable ROM (EEPROM), PROM, a magnetic memory, a magnetic disc, and an optical disc.

The programs stored in the memory 1700 may be classified into a plurality of modules according to functions thereof, e.g., a user interface (UI) module 2710, a touchscreen module 2720, an alarm module 2730, and the like.

The UI module 2710 may provide a specified UI, a specified GUI, or the like interoperating with the mobile device 2000 for each application. The touchscreen module 2720 may sense a touch gesture of the user on the touchscreen and transmit information regarding the touch gesture to the control unit 2300. The touchscreen module 2720 may be configured by separate hardware including a controller.

Various sensors may be provided inside or around the touchscreen to sense a touch or a proximity touch on the touchscreen. The alarm module 2730 may generate a signal for informing of the occurrence of an event of the mobile device 2000.

Some embodiments may be implemented in a form of a recording medium including computer-executable instructions such as a program module executed by a computer system. A computer-readable recording medium may be an arbitrary recording medium which may be accessed by a computer system and includes volatile and non-volatile media and separated and non-separated media. In addition, the computer-readable recording medium may include computer storage media and communication media. The computer storage media include all types of volatile and non-volatile and separated and non-separated media implemented by an arbitrary method or technique for storing information such as computer-readable instructions, a data structure, a program module, or other data. The communication media typically include computer-readable instructions, a data structure, a program module, other data of a modulated signal such as a carrier, other transmission mechanisms, and arbitrary information delivery media.

In addition, in the present specification, the term "unit" may indicate a hardware component such as a processor or a circuit and/or a software component executed by a hardware component such as a processor.

The embodiments described above are only illustrative, and it will be understood by those of ordinary skill in the art to which the present disclosure belongs that various changes in form and details may be made therein without changing the technical spirit and mandatory features of the present disclosure. Therefore, the embodiments should be understood in the illustrative sense only and not for the purpose of limitation in all aspects. For example, each component described as a single type may be carried out by being distributed, and likewise, components described as a distributed type may also be carried out by being coupled.

The scope of the present disclosure is defined not by the detailed description but by the appended claims, and all changed or modified forms derived from the meaning and the scope of the claims and the equivalent concepts thereof will be construed as being included in the present disclosure.

The invention claimed is:

1. A method, performed by an electronic device, of controlling a wireless charging device in a vehicle, the method comprising:
   identifying at least one mobile device in the vehicle;
   obtaining state information of the identified at least one mobile device;
   obtaining state information of the vehicle;
   controlling power and charging strengths of a plurality of wireless charging devices in the vehicle based on the state information of the mobile device and the state information of the vehicle; and
   controlling the charging strengths of the plurality of wireless charging devices in the vehicle based on information about a predicted arrival time obtained from a navigation device configured to guide a traveling path of the vehicle, wherein the state information of the vehicle includes information about a voltage of a battery in the vehicle and a current power consumption amount of the vehicle.

2. The method of claim 1, further comprising:
checking the number of the identified at least one mobile device;
selecting at least one of the plurality of wireless charging devices based on the checked number; and
turning on power of the selected wireless charging device.

3. The method of claim 1, further comprising:
checking a remaining battery capacity of the identified at least one mobile device based on the state information of the mobile device;
selecting at least one of the plurality of wireless charging devices based on the checked remaining battery capacity; and
turning on power of the selected wireless charging device.

4. The method of claim 3, further comprising displaying alarm information informing that charging of a battery of the mobile device is necessary, based on the checked remaining battery capacity.

5. The method of claim 1, further comprising checking at least one of a traveling speed of the vehicle and a current power use amount of the vehicle based on the state information of the vehicle,
wherein the controlling of the power comprises controlling power of the wireless charging device based on at least one of the checked traveling speed and current power use amount.

6. The method of claim 1, further comprising:
identifying a seat on which a user sits among seats in the vehicle, based on the state information of the vehicle;
selecting at least one of the plurality of wireless charging devices based on a location of the identified seat; and
turning on power of the selected wireless charging device.

7. The method of claim 1, wherein identifying the mobile device comprises receiving identification information of the mobile device from the mobile device through the wireless charging device when the mobile device is on the wireless charging device.

8. The method of claim 1, wherein, when the mobile device is on the wireless charging device, a preset communication function of the mobile device is activated, and identification information of the mobile device on which the communication function is activated is directly provided from the mobile device to the electronic device.

9. An electronic device for controlling a wireless charging device in a vehicle, the electronic device comprising:
a communication unit configured to connect communication with at least one mobile device in the vehicle;
a storage unit storing at least one instruction for controlling the wireless charging device in the vehicle; and
a processor configured, by executing the stored at least one instruction, to identify at least one mobile device in the vehicle, obtain state information of the identified mobile device, obtain state information of the vehicle, control power and charging strengths of a plurality of wireless charging devices in the vehicle based on the state information of the mobile device and the state information of the vehicle, and control the charging strengths of the plurality of wireless charging devices in the vehicle based on information about a predicted arrival time obtained from a navigation device configured to guide a traveling path of the vehicle,
wherein the state information of the vehicle includes information about a voltage of a battery in the vehicle and a current power consumption amount of the vehicle.

10. The electronic device of claim 9, wherein the processor is further configured, by executing the stored at least one instruction, to check the number of the identified at least one mobile device, select at least one of the plurality of wireless charging devices based on the identified number, and turn on power of the selected wireless charging device.

11. The electronic device of claim 9, wherein the processor is further configured, by executing the stored at least one instruction, to check a remaining battery capacity of the identified at least one mobile device based on the state information of the mobile device, select at least one of the plurality of wireless charging devices based on the checked remaining battery capacity, and turn on power of the selected wireless charging device.

12. The electronic device of claim 11, wherein the processor is further configured, by executing the stored at least one instruction, to display alarm information informing that charging of a battery of the mobile device is necessary, based on the checked remaining battery capacity.

13. A computer program product comprising a non-transitory recording medium storing a program for performing a method of controlling a wireless charging device in a vehicle, the method comprising:
identifying at least one mobile device in the vehicle;
obtaining state information of the identified mobile device;
obtaining state information of the vehicle;
controlling power and charging strengths of a plurality of wireless charging devices in the vehicle based on the state information of the mobile device and the state information of the vehicle; and
controlling the charging strengths of the plurality of wireless charging devices in the vehicle based on information about a predicted arrival time obtained from a navigation device configured to guide a traveling path of the vehicle,
wherein the state information of the vehicle includes information about a voltage of a battery in the vehicle and a current power consumption amount of the vehicle.

* * * * *